(12) United States Patent
Ehle

(10) Patent No.: US 10,537,058 B2
(45) Date of Patent: Jan. 21, 2020

(54) STALK ROLL ASSEMBLY FOR MANAGEMENT OF HARVEST RESIDUE

(71) Applicant: 360 Yield Center, LLC, Morton, IL (US)

(72) Inventor: Austin Ehle, Mount Pulaski, IL (US)

(73) Assignee: 360 Yield Center, LLC, Morton, IL (US)

( * ) Notice: Subject to any disclaimer, the term of this patent is extended or adjusted under 35 U.S.C. 154(b) by 89 days.

(21) Appl. No.: 15/655,657

(22) Filed: Jul. 20, 2017

(65) Prior Publication Data
US 2017/0311542 A1 Nov. 2, 2017

Related U.S. Application Data

(63) Continuation of application No. PCT/US2016/014177, filed on Jan. 20, 2016.
(Continued)

(51) Int. Cl.
*A01D 45/02* (2006.01)
*A01D 34/44* (2006.01)
*A01D 41/14* (2006.01)

(52) U.S. Cl.
CPC .......... *A01D 34/44* (2013.01); *A01D 41/14* (2013.01); *A01D 45/025* (2013.01)

(58) Field of Classification Search
CPC ...... A01D 34/44; A01D 41/14; A01D 45/021; A01D 45/023; A01D 45/025; A01D 47/00;
(Continued)

(56) References Cited

U.S. PATENT DOCUMENTS

| 493,453 A | 3/1893 | Taylor |
| 778,040 A | 12/1904 | Holland-Letz |

(Continued)

FOREIGN PATENT DOCUMENTS

| DE | 19855526 C1 | 6/2000 |
| DE | 29923382 U1 | 10/2000 |

(Continued)

OTHER PUBLICATIONS

International Search Report and Written Opinion by ISA/US, PCT Application No. PCT/US2016/014177, dated Mar. 24, 2016, 11 pages.

*Primary Examiner* — Robert E Pezzuto
*Assistant Examiner* — Adam J Behrens
(74) *Attorney, Agent, or Firm* — Thomas J. Oppold; Larkin Hoffman Daly & Lindgren, Ltd.

(57) ABSTRACT

A stalk roll assembly for header of a combine harvester. The assembly includes first and second stalk rolls spaced laterally with respect to one another and rotating in opposite directions. Each stalk roll includes a frusto-conical nose and a cylindrical body. The cylindrical body includes a plurality of radially extending flutes. The nose includes a pair of helical flights. The plurality of flutes includes at least one cutting flute having a straight edge and a plurality of puncturing flutes with teeth. The stalk rolls are laterally offset a distance that permits the tips of the flutes to laterally overlap and the teeth of the puncturing flutes are longitudinally offset so the tips of the teeth are received between with the valleys of the teeth of the other stalk roll.

16 Claims, 34 Drawing Sheets

Related U.S. Application Data

(60) Provisional application No. 62/203,370, filed on Aug. 10, 2015, provisional application No. 62/105,252, filed on Jan. 20, 2015.

(58) Field of Classification Search
CPC ... A01D 43/081; A01D 43/082; A01D 43/083
See application file for complete search history.

(56) References Cited

U.S. PATENT DOCUMENTS

| | | | |
|---|---|---|---|
| 787,750 A | 4/1905 | Goodhue | |
| 799,845 A | 9/1905 | Goodhue | |
| 882,500 A | 3/1908 | Ingersoll | |
| 1,421,459 A | 7/1922 | Gritzmacher | |
| 1,466,870 A | 9/1923 | Baird | |
| 1,552,872 A | 9/1925 | Oppeneheim et al. | |
| 1,561,338 A | 11/1925 | Malmberg | |
| 1,641,436 A | 9/1927 | Jett | |
| 1,641,682 A | 9/1927 | Kruse | |
| 1,647,936 A | 11/1927 | Schuld | |
| 1,682,143 A | 8/1928 | Paradise | |
| 1,736,347 A * | 11/1929 | Keeler | A01D 45/025 460/32 |
| 1,764,686 A | 6/1930 | Kuhlman | |
| 1,827,216 A | 10/1931 | Synck | |
| 1,830,772 A | 11/1931 | Stadtherr | |
| 2,041,139 A | 5/1936 | Marxman | |
| 2,103,002 A | 12/1937 | Faber | |
| 2,169,070 A | 8/1939 | Kuhlman | |
| 2,178,013 A | 10/1939 | Blank | |
| 2,180,594 A | 11/1939 | Kuhlman | |
| 2,219,483 A | 10/1940 | Lukes | |
| 2,234,447 A | 3/1941 | Norman | |
| 2,241,928 A | 5/1941 | Shedd et al. | |
| 2,252,159 A | 8/1941 | Blank | |
| 2,308,102 A | 1/1943 | Paradise et al. | |
| 2,315,950 A | 4/1943 | Fitzloff | |
| 2,490,715 A | 12/1949 | Shrader | |
| 2,534,685 A | 12/1950 | Shrader | |
| 2,538,965 A | 1/1951 | Fergason | |
| 2,569,175 A | 9/1951 | Karlsson | |
| 2,576,292 A | 11/1951 | Flora | |
| 2,584,180 A | 2/1952 | Aasland | |
| 2,584,204 A | 2/1952 | Heth | |
| 2,589,841 A | 3/1952 | Miller | |
| 2,604,749 A | 7/1952 | Fergason | |
| 2,604,750 A | 7/1952 | Fergason | |
| 2,618,113 A | 11/1952 | Hyman | |
| 2,618,273 A | 11/1952 | Karlsson | |
| 2,634,731 A | 4/1953 | Karlsson | |
| 2,651,163 A | 9/1953 | Aasland | |
| 2,656,666 A * | 10/1953 | Collins | A01D 45/025 460/32 |
| 2,668,543 A | 2/1954 | Stoddard | |
| 2,676,450 A | 4/1954 | Schaaf et al. | |
| 2,678,526 A | 5/1954 | Voss | |
| 2,689,441 A | 9/1954 | Rosenthal | |
| 2,728,183 A | 12/1955 | Ratmeyer | |
| 2,744,375 A | 5/1956 | Kidder | |
| 2,751,743 A | 6/1956 | Bauer | |
| 2,768,626 A | 10/1956 | Pelowski | |
| 2,771,731 A | 11/1956 | Heth et al. | |
| 2,821,058 A * | 1/1958 | Jones | A01D 45/021 460/32 |
| 2,842,929 A | 7/1958 | Schultz et al. | |
| 2,881,579 A | 4/1959 | Aasland | |
| 2,903,836 A | 9/1959 | Sheets | |
| 2,905,181 A | 9/1959 | Nelson | |
| 2,947,133 A | 8/1960 | Hyman et al. | |
| 3,001,527 A | 9/1961 | Jones | |
| 3,090,388 A | 5/1963 | Schulze | |
| 3,098,491 A | 7/1963 | Mitchell | |
| 3,100,491 A | 8/1963 | Dillon | |
| 3,126,690 A | 3/1964 | Keller et al. | |
| 3,139,887 A | 7/1964 | Karlsson et al. | |
| 3,174,484 A | 3/1965 | Anderson | |
| 3,222,852 A | 12/1965 | Ward et al. | |
| 3,241,216 A | 3/1966 | Wellendorf | |
| 3,304,702 A | 2/1967 | Russell | |
| 3,462,928 A | 8/1969 | Schreiner et al. | |
| 3,633,348 A | 1/1972 | Sears et al. | |
| 3,707,833 A | 1/1973 | Sutton | |
| 3,832,836 A | 9/1974 | Anderson | |
| 3,858,384 A | 1/1975 | Maiste et al. | |
| 3,982,385 A | 9/1976 | Hyman | |
| 4,219,990 A | 9/1980 | Hill | |
| 4,233,804 A | 11/1980 | Fischer et al. | |
| 4,630,430 A | 12/1986 | Weeks | |
| 4,974,402 A | 12/1990 | Ostrup et al. | |
| 5,009,061 A | 4/1991 | Heuling | |
| 5,040,361 A | 8/1991 | Briesemeister | |
| 5,212,935 A * | 5/1993 | Sanders | A01D 45/021 56/103 |
| 5,282,352 A | 2/1994 | Schoolman | |
| 5,404,699 A | 4/1995 | Christensen et al. | |
| 6,050,071 A | 4/2000 | Bich et al. | |
| 6,216,428 B1 | 4/2001 | Becker et al. | |
| 7,237,373 B2 | 7/2007 | Resing et al. | |
| 7,373,767 B2 | 5/2008 | Calmer | |
| 7,469,524 B2 | 12/2008 | Rieck et al. | |
| 7,716,908 B2 | 5/2010 | Christensen et al. | |
| 7,788,890 B2 | 9/2010 | Cressoni | |
| 7,886,510 B2 | 2/2011 | Calmer | |
| 7,992,371 B2 | 8/2011 | Rieck et al. | |
| 8,171,708 B2 | 5/2012 | Calmer | |
| 8,464,505 B1 | 6/2013 | Calmer | |
| 8,646,250 B2 | 2/2014 | Lohrentz et al. | |
| 8,720,171 B2 | 5/2014 | Lohrentz et al. | |
| 8,720,172 B2 | 5/2014 | Lohrentz et al. | |
| 8,955,297 B2 | 2/2015 | Capello et al. | |
| 9,210,842 B2 | 12/2015 | Lohrentz et al. | |
| 9,560,804 B1 * | 2/2017 | Calmer | A01D 45/025 |
| 2003/0079459 A1 * | 5/2003 | Bongert | A01D 45/025 56/104 |
| 2004/0016219 A1 | 1/2004 | Calmer | |
| 2004/0123577 A1 | 7/2004 | Resing et al. | |
| 2009/0188229 A1 | 7/2009 | Eagles et al. | |
| 2011/0047949 A1 | 3/2011 | Glazier et al. | |
| 2012/0042627 A1 * | 2/2012 | Lohrentz | A01D 45/021 56/119 |
| 2014/0182255 A1 | 7/2014 | Calmer | |
| 2014/0260164 A1 * | 9/2014 | Lohrentz | A01D 45/025 56/104 |
| 2015/0082760 A1 * | 3/2015 | Zentner | A01D 45/021 56/62 |
| 2015/0257337 A1 | 9/2015 | Schrattenecker | |
| 2015/0319926 A1 | 11/2015 | Madheswaran et al. | |
| 2017/0188517 A1 * | 7/2017 | Schloesser | A01D 45/023 |
| 2018/0139902 A1 * | 5/2018 | Walker | A01D 41/06 |
| 2019/0174675 A1 | 6/2019 | Gramm et al. | |

FOREIGN PATENT DOCUMENTS

| | | | |
|---|---|---|---|
| DE | 102005054998 A1 | 5/2007 | |
| EP | 0846409 B1 | 7/2001 | |
| EP | 1040746 B1 | 6/2003 | |
| EP | 0943229 B1 | 8/2003 | |
| EP | 1049367 B1 | 3/2004 | |
| EP | 1502492 A2 | 2/2005 | |
| WO | WO-2014165192 A1 * | 10/2014 | A01D 45/025 |
| WO | WO-2018035537 A1 * | 2/2018 | A01D 45/025 |
| WO | WO-2018136686 A1 * | 7/2018 | A01D 45/025 |

* cited by examiner

STALK ROLL ASSEMBLY FOR MANAGEMENT OF HARVEST RESIDUE

CROSS-REFERENCE TO RELATED APPLICATIONS

This application is a continuation of International Application No. PCT/US2016/014177, filed Jan. 20, 2016, which claims the benefit of U.S. Provisional Application No. 62/203,370, filed Aug. 10, 2015 and U.S. Provisional Application No. 62/105,252, filed Jan. 20, 2015. Each of the above-referenced applications are incorporated herein by reference in their entireties.

BACKGROUND

Modern conventional agricultural combine harvesters or "combines" utilize removable and interchangeable attachments called "headers" or "heads" which are adapted for harvesting different types of crops. An example of a conventional combine 10 is shown in FIGS. 1 and 2 with a conventional header attachment 20 used for harvesting corn (i.e., a "cornhead" or "cornheader"). The conventional cornheader 20 includes a plurality of conical crop divider points 22 ("points" or "snouts") which extend forwardly and diverge rearwardly. Row unit assemblies 30 are disposed between the adjacent points where the rearwardly diverging points 22 nearly converge. In FIG. 1, a cornhead 20 is illustrated with twelve row unit assemblies 30 (i.e., a 12-row cornhead) but it should be understood that cornhead sizes typically range from four rows to twenty-four rows or more.

As illustrated in FIG. 3, during harvesting operations, the combine 10 is positioned with the points 22 of the cornhead 20 positioned between adjacent corn rows 12 and below the ears 14 on the cornstalks 16. It should be appreciated that as the combine 10 drives forwardly through the field as indicated by the arrow 18 in FIG. 2, the conical, rearwardly diverging shape of the points 22 causes the cornstalks 16 within each row 12 to be guided and directed into the row unit assemblies 30 between the adjacent points 22. As explained in more detail below, the row unit assemblies 30 separate the ears 14 from the cornstalks 16 and convey the separated ears toward the cross-auger 24. The cross-auger 24 augers the separated ears 14 toward the opening 27 of the feederhouse 26 in the middle of the cornheader 20. The feederhouse 26 conveys the ears 14 into the interior of the combine where the corn kernels are separated from the corncob. The separated kernels then pass over a series of screens which separates unwanted crop material and other residue from the kernels. The clean grain is then carried by elevators to a clean grain holding tank while the corncobs, leaves, husks and cornstalks which entered the combine are chopped and discharged through the rear of the combine and mix with the cornstalks that pass under the combine.

Referring to FIGS. 4-6, each row unit 20 includes a pair gathering chains 32, 34 with outwardly extending lugs 36. The gathering chains 32, 34 extend around drive sprockets 38 and idler sprockets 39 (FIG. 5). Rotation of the drive sprockets 38 causes the gathering chains 32, 34 to rotate in adjacent parallel paths such that as the combine 10 drives forwardly through the field, the outwardly extending lugs 36 draw the cornstalks 16 into the row unit 30. Below the rotating gathering chains is a pair of spaced stripper plates 40, 42. The stripper plates 40, 42 are spaced sufficiently apart to define a gap 44 between them which is sufficiently wide to permit the corn stalks 16 to enter but which is sufficiently narrow so that the corn ears 14 cannot pass through. A pair of rapidly rotating stalk rolls 50, 52 are positioned below stripper plates 40, 42.

As best illustrated in FIG. 6, during harvesting operations, the rotating stalk rolls 50, 52 rapidly pull the corn stalks 16 downwardly through the gap 44 between the stripper plates 40, 42 such that when the corn ears 14 engage the stripper plates 40, 42, the ears 14 are pulled or stripped from the cornstalks 16. Ideally, as the stalk rolls 50, 52 rotate, the entire cornstalk 16 is pulled downwardly through the gap 44 and is returned to the field below the header 20 as the combine drives forwardly (FIG. 2). It should be appreciated that if the cornstalk snaps or breaks prior to ear separation or after ear separation such that the entire cornstalk is not pulled through the gap 44, the amount of plant material entering the feederhouse 26 will increase, requiring more horsepower and thus more fuel consumption. The stripped ears 14 which remain on the stripper plates 40, 42 after the cornstalk 16 is pulled through the gap 44 are then conveyed by the lugs 36 of the gathering chains 32, 34 upwardly and rearwardly to the cross-auger 24. The cross-auger 24 augers the ears 14 to the feederhouse 26, and the feederhouse 26 feeds the ears 14 into the interior of the combine for shelling and separating the kernels from the corncob as is known in the art.

While conventional stalk rolls generally serve their intended purpose to pull and strip the ears from the cornstalks, conventional stalks rolls do not achieve the necessary throughput of crop material when harvesting at higher speeds. Conventional stalk rolls typically have a tapered nose portion and a cylindrical body portion. The nose portion is typically fitted with auger flights while the cylindrical portion has a plurality of horizontal flutes that run parallel to the axis of the stalk roll with the flute profile co-radial with the cylindrical portion. In use, as illustrated in FIG. 6, as the stalk rolls rotate, the auger flights on the nose draw the cornstalks towards the cylindrical body. Once the cornstalk is between the cylindrical bodies of the adjacent stalk rolls the horizontal flutes crush the cornstalks and pull the cornstalks downwardly through the stripper plates 40, 42 as previously described. It has been found that the transition point between the auger flights on the nose and the horizontal flutes on the cylindrical body of the stalk roll often restricts the throughput of the cornstalks, such that the cornstalks seam to hesitate or fail to advance, or even bind, at this transition point despite the rotation of the auger flights and forward advancement of the combine. If the cornstalks stall at this transition point, the gathering chains may snap off or break off the cornstalk causing a large portion of the cornstalk to be pulled into the cornheader and fed into the combine rather than the stripped cornstalk passing under the cornheader as previously described. Additionally, if the cornstalk is snapped off prematurely or whipped around by the stalk rolls, the corn ears can be flung from the stalk and land on the ground and not be harvested.

Second, some stalk rolls do not effectively cut and crush the cornstalk, thereby leaving long sections of the cornstalk intact and not cut and crushed in more than one direction with respect to the axis of the cornstalk. These long sections decompose very slowly, limiting their potential benefit to subsequent crops. Still other stalk rolls chop and crush the cornstalks so finely, as to potentially create a negative impact on soil microbial activity which can negatively affect the next season's crop. For example, the cornstalks that are cut and crushed and pass under the cornheader, together with the unwanted corncobs, husks and leaves that passes through and are discharged by the combine, i.e., the crop residue—commonly called corn stover—has a carbon to nitrogen to ratio of 57:1. When the stover is chopped to small pieces, soil microbes will quickly work to decompose the stover. This relatively rapid decomposition forces the microbes to find additional nitrogen to go with the excess carbon to consume the stover because it contains a greater proportion of carbon to nitrogen. The soil microbes then tie up any excess nitrogen available in the soil, called immobilization, creating a deficit of nitrogen in the soil, which nitrogen deficit can extend into the next crop season thereby negatively affecting the critical early growth stages of the next season's crop. This condition may persist until the beneficial soil microbes die, decompose, and release nitrogen (mineralization) contained in their bodies, or some other source of nitrogen becomes available in the soil.

Third, some stalk rolls are not designed to crush and cut varying cornstalk diameters. For example, cornstalks have a larger diameter at their base near the root system and the diameter decreases along the length of the cornstalk toward the tassel. It is important that the entire cornstalk length be crushed and cut to the appropriate residue size to aid in decomposition.

Accordingly, there is a need for a stalk roll which allows for high throughput of plant material, which crushes the cornstalks in more than one direction and is capable of chopping cornstalks of varying diameters across the field and of varying diameters along the length of the cornstalks to aid decomposition in the field.

DESCRIPTION

Figure 1:
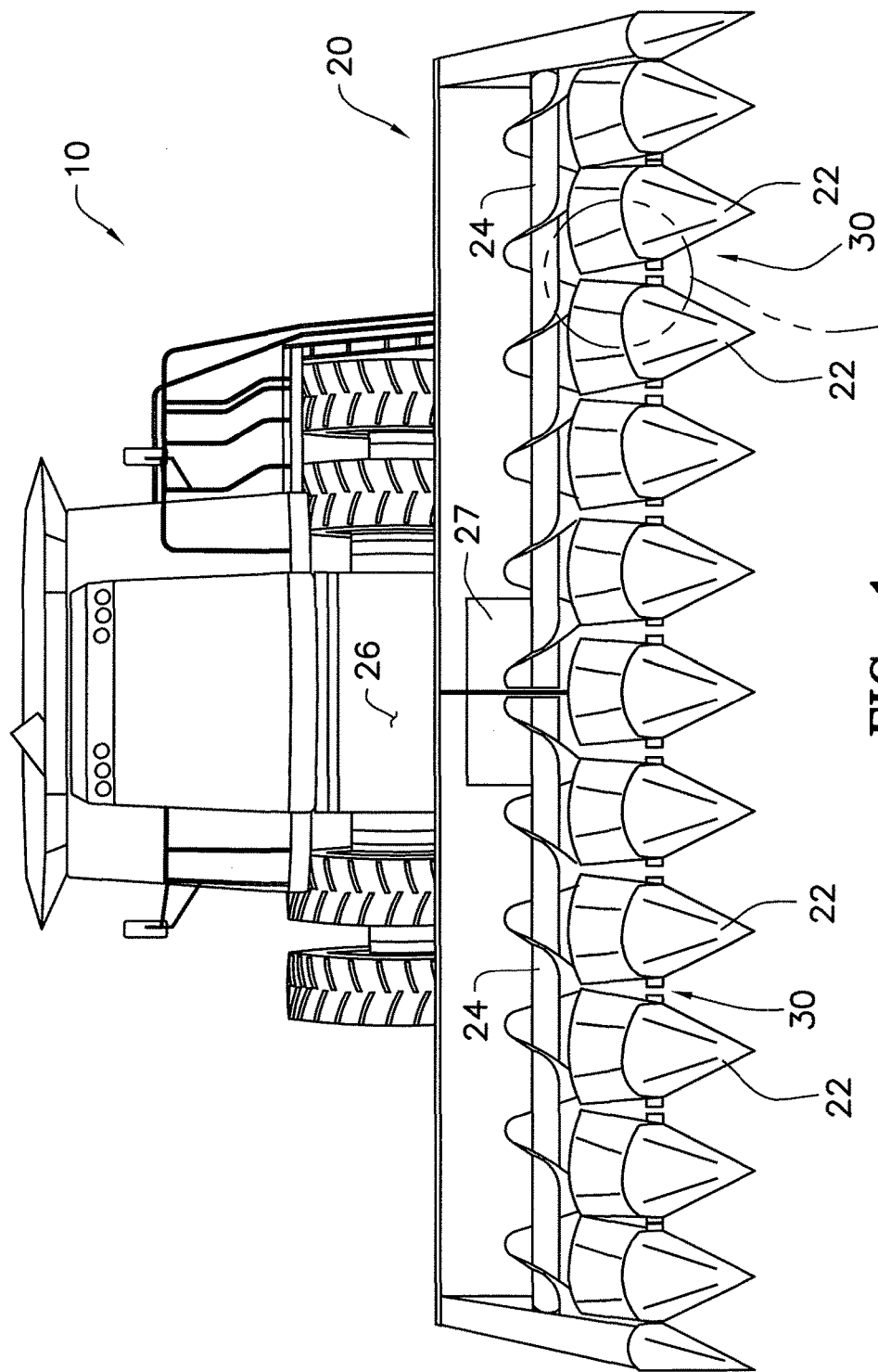
FIG. 1 is a front elevation view of an embodiment of a modern conventional agricultural combine harvester with a cornhead attachment.
Figure 2:
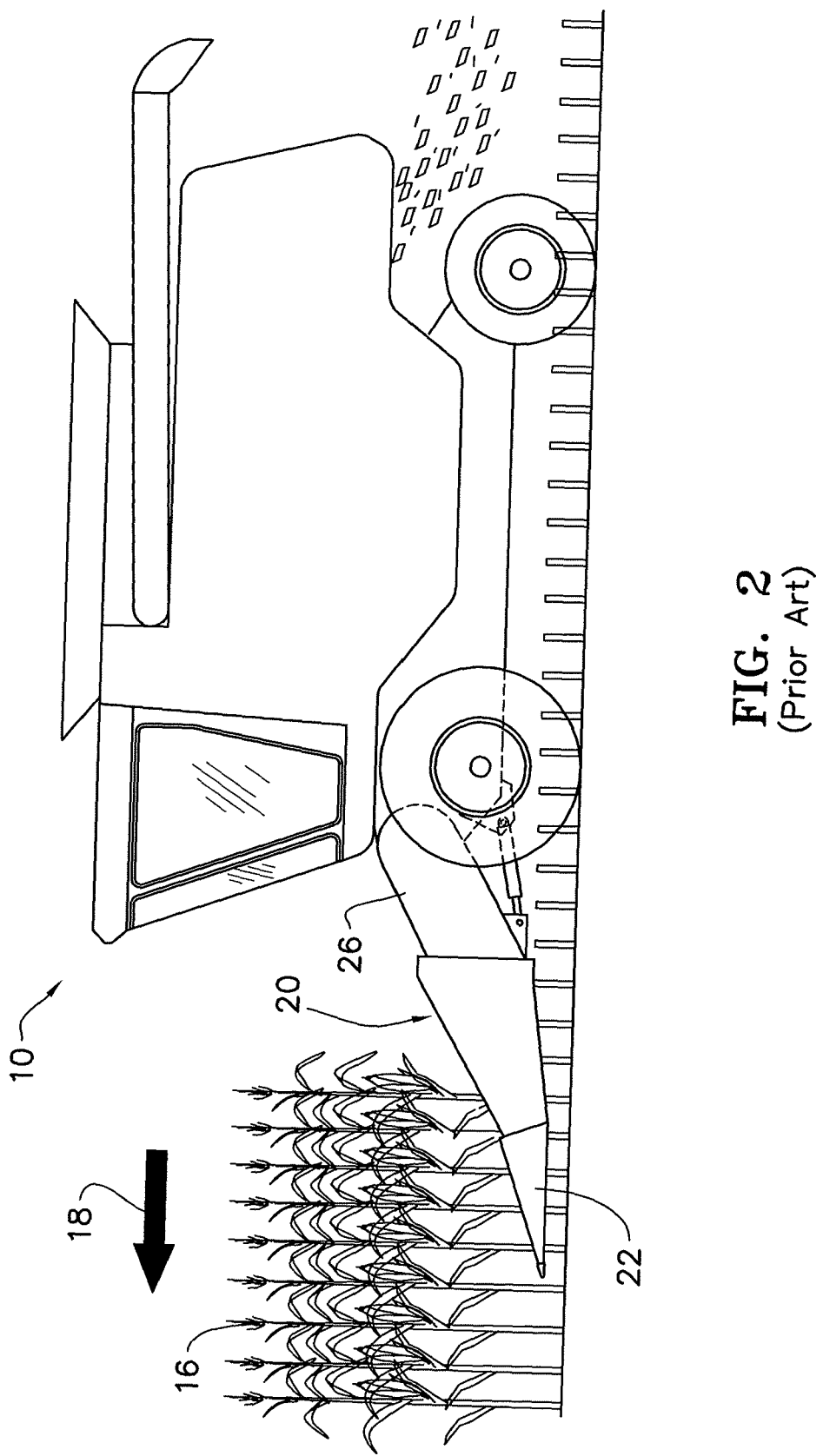
FIG. 2 is a side elevation view of the combine harvester and cornhead of FIG. 1.
Figure 3:
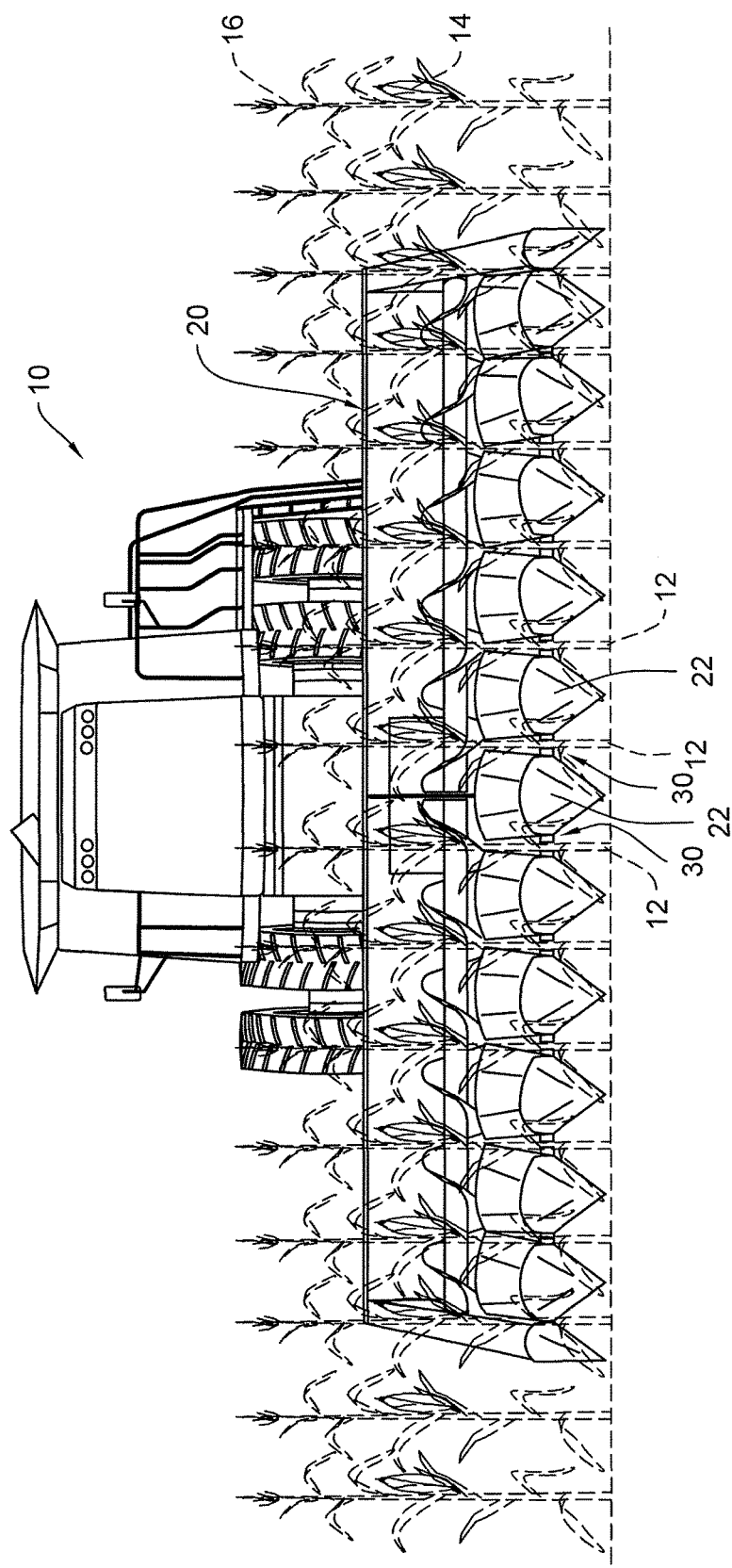
FIG. 3 is the same front elevation view of the combine harvester and cornhead of FIG. 1, but shown in a cornfield in harvesting position.
Figure 4:
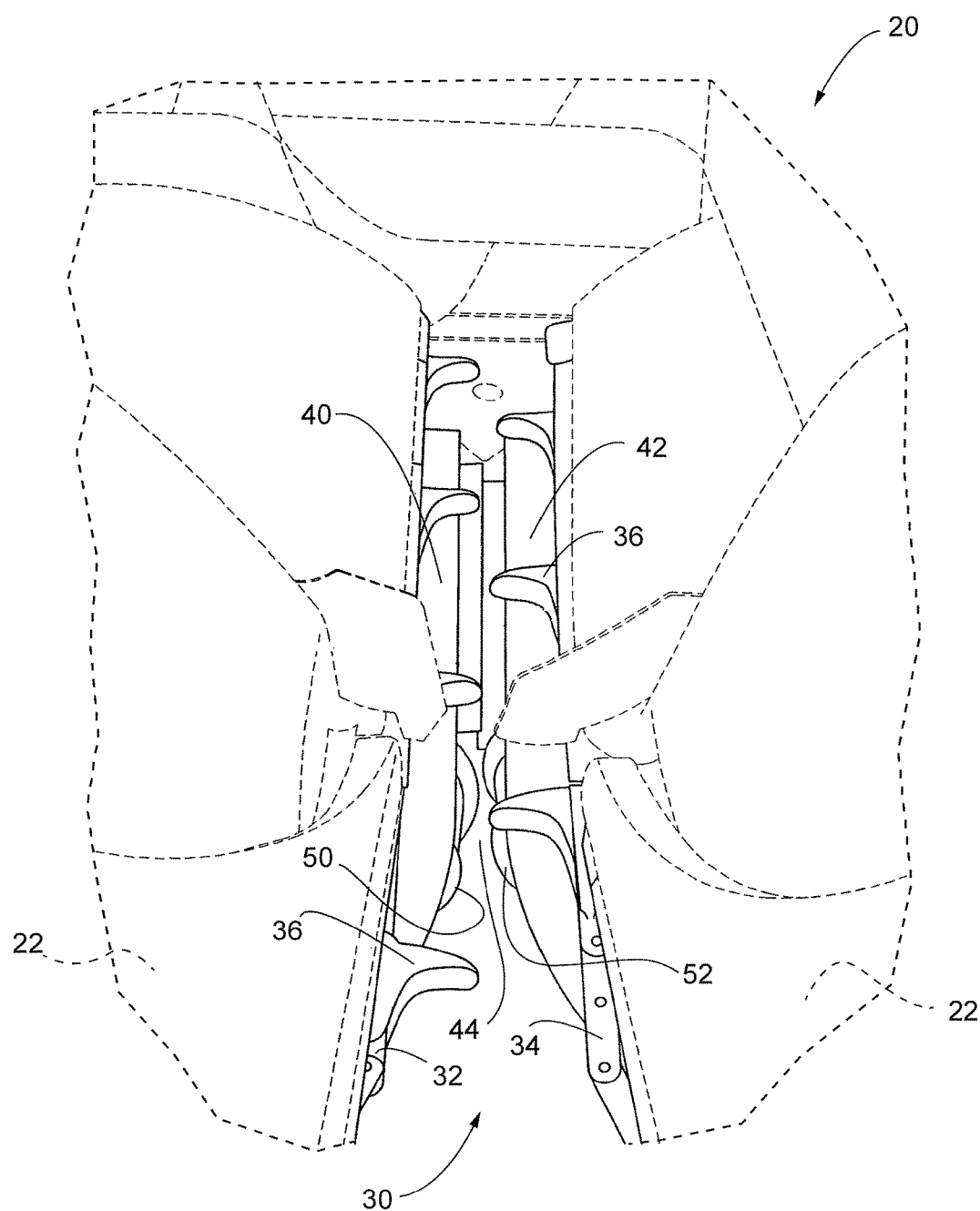
FIG. 4 is an enlarged view of the portion of the cornheader circled in FIG. 1 showing parts of the row unit assembly between the crop divider points.
Figure 5:
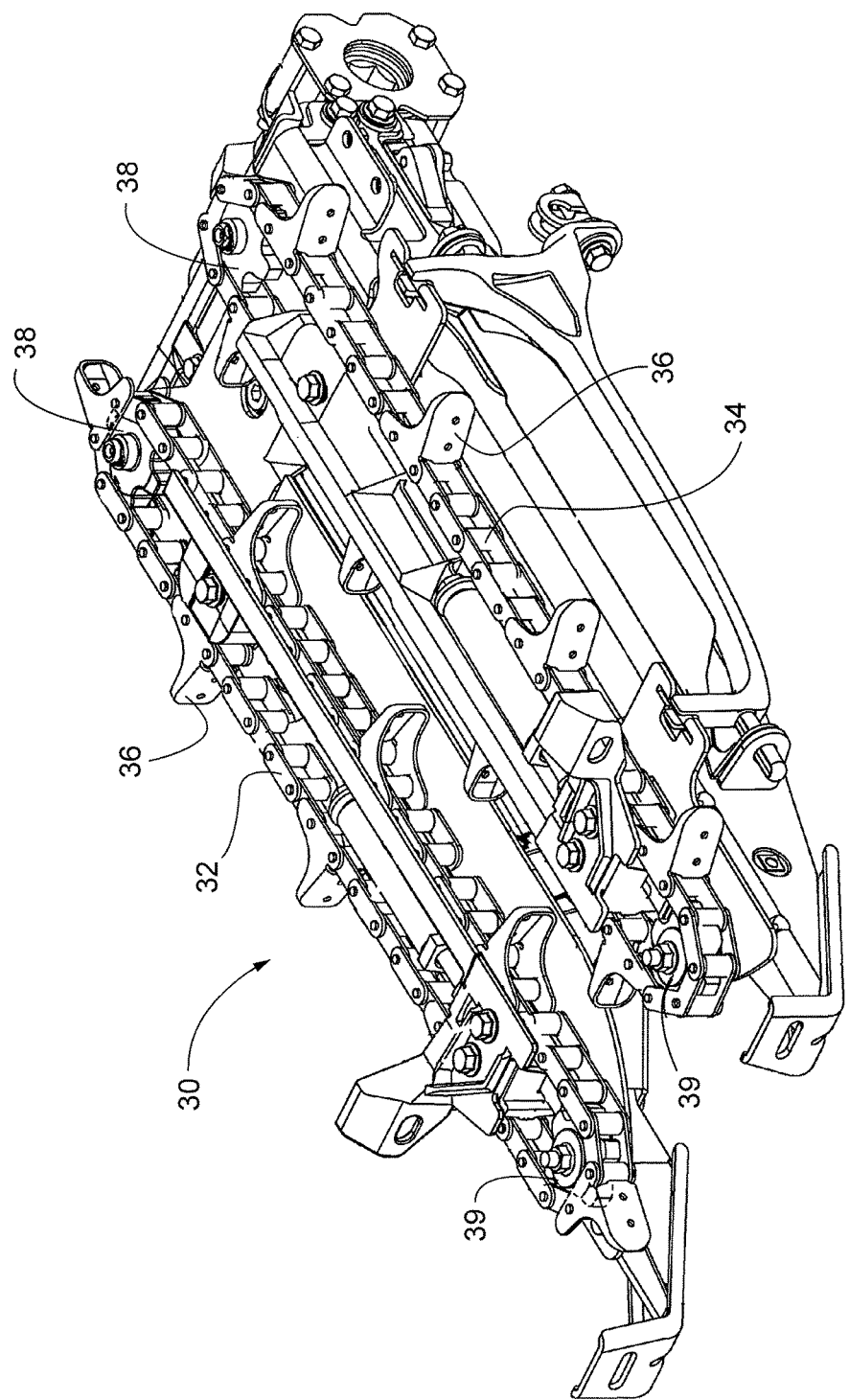
FIG. 5 is a perspective view of a row unit assembly.
Figure 6:
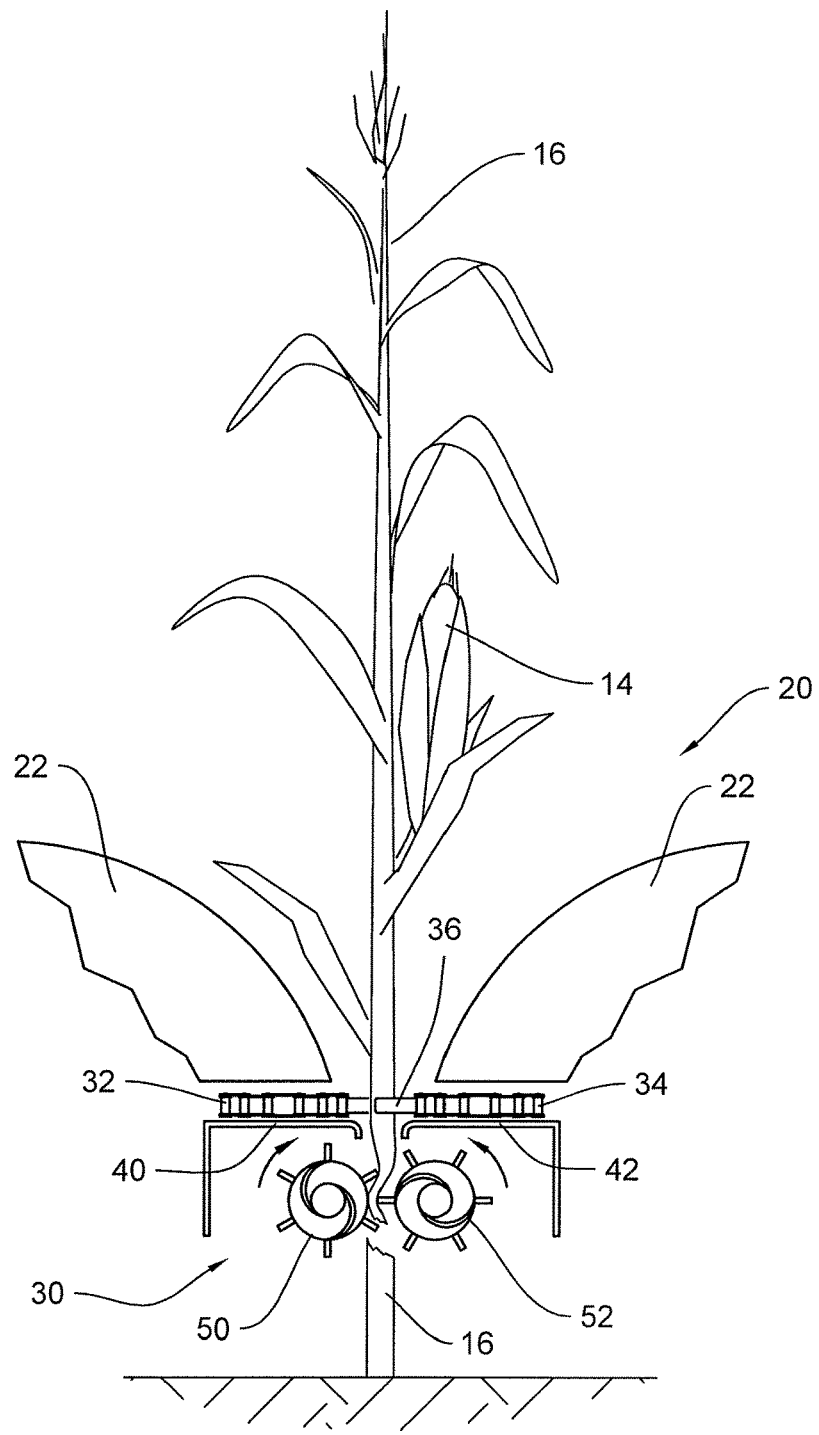
FIG. 6 is a partial front elevation view of a row unit assembly in operation.
Figure 7:
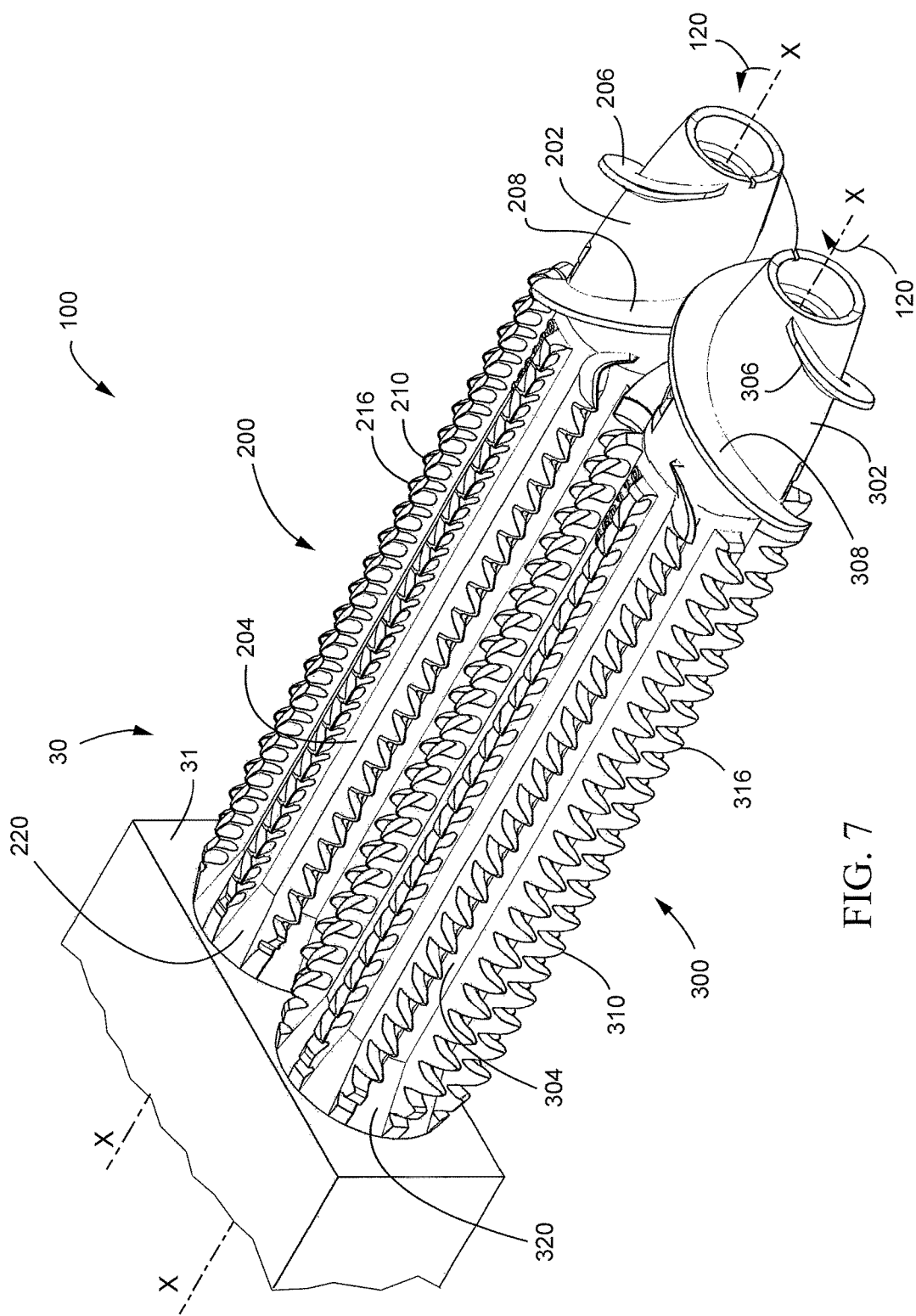
FIG. 7 is a front perspective view of an embodiment of a stalk roll assembly comprising first and second stalk rolls.
Figure 8:
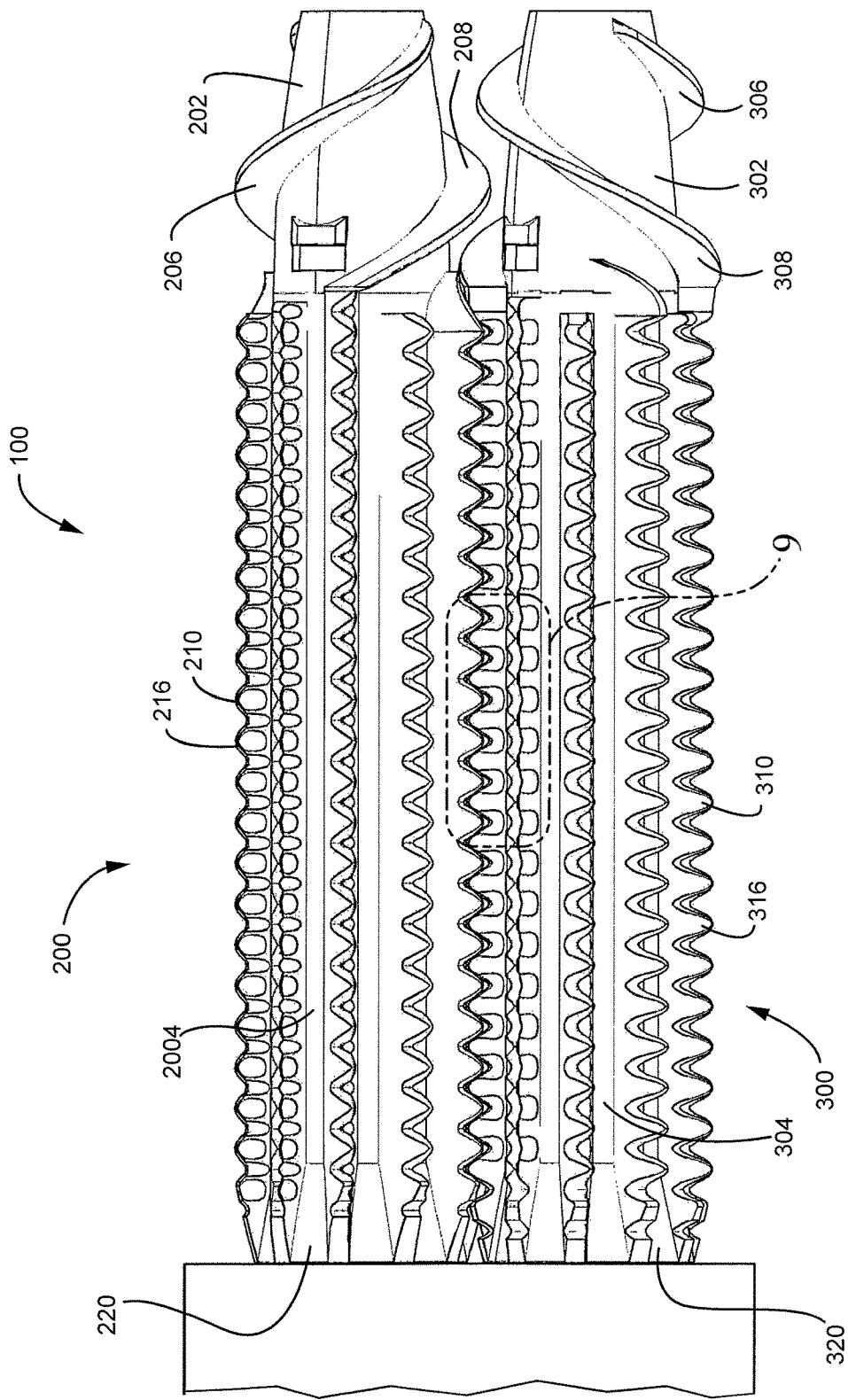
FIG. 8 is a top plan view of the stalk roll assembly of FIG. 7.

Referring to the drawings wherein like reference numerals designate the same or corresponding parts throughout the several views of the drawings, FIG. 7 shows an embodiment of a stalk roll assembly 100 comprising first and second adjacently spaced stalk rolls 200, 300 which may form part of a row unit 30 of an original equipment manufacturer (OEM) or as a replacement stalk roll assembly for purposes of retrofitting an OEM row unit 30. FIG. 8 is a top plan view of the stalk roll assembly 100 of FIG. 7. The stalk rolls 200, 300 are removably secured in a conventional manner by drive shafts (not shown) which extend forwardly from a frame member 31 of the row unit assembly 30. It should be appreciated that the configuration of the drive shafts and manner of attachment to the drive shafts may vary between makes and models of combine headers as recognized and understood by those of skill in the art.

In operation, each of the stalk rolls 200, 300 rotate about their respective longitudinal X-X axis in the direction indicated by arrow 120. As will be described in detail later, each of the stalk rolls 200, 300 has a slightly different configuration which cooperate to achieve high throughput of the cornstalks, leaves, husks, etc., while also ensuring that the cornstalks are crushed along their length in more than one direction and chopped in lengths preferably between six to eight inches in length.

Each of the stalk rolls 200, 300 is illustrated and described separately below, but first, the common features of both stalk rolls are described together with reference numerals in the 200-series referring to the feature of the first stalk roll 200 and reference numerals in the 300-series referring to the features of the second stalk roll 300.

Each stalk roll 200, 300 has a frusto-conical nose 202, 302 which transitions into an elongated substantially cylindrical body 204, 304. The nose 202, 302 includes a pair of flights 206, 208 and 306, 308 which extend helically rearwardly toward the cylindrical body 204, 304. It should be appreciated that the helical direction of the flights of the respective stalk rolls are opposite one another such that when the stalk rolls 200, 300 rotate in the direction indicated by arrows 120, the flights will cooperate to draw the cornstalks rearwardly toward and between the cylindrical bodies 204, 304 of the adjacently disposed stalk rolls 200, 300.

Each cylindrical body 204, 304 includes a plurality of flutes 210, 310 extending radially outwardly and spaced equidistantly around the circumference of the body 204, 304 and which extend along the length of the body 204, 304 in substantially parallel relation. The flutes 210, 310 are wide at their base 212, 312 and get progressively narrower as they curve or hook toward the outer edge 214, 314 resulting in concave surface 230, 330 and a convex surface 232, 332. For the reasons discussed in detail later, one of the flutes 210, 310 of each stalk roll has a straight outer edge and is hereinafter referred to as the "cutting flute" (not visible in FIGS. 7 and 8). The outer edges 214, 314 of the other remaining flutes 210, 310 are serrated resulting in a plurality of pointed teeth 216, 316 extending along their lengths, each of these serrated flutes is hereinafter referred to as a "puncturing flute".

Figure 9:
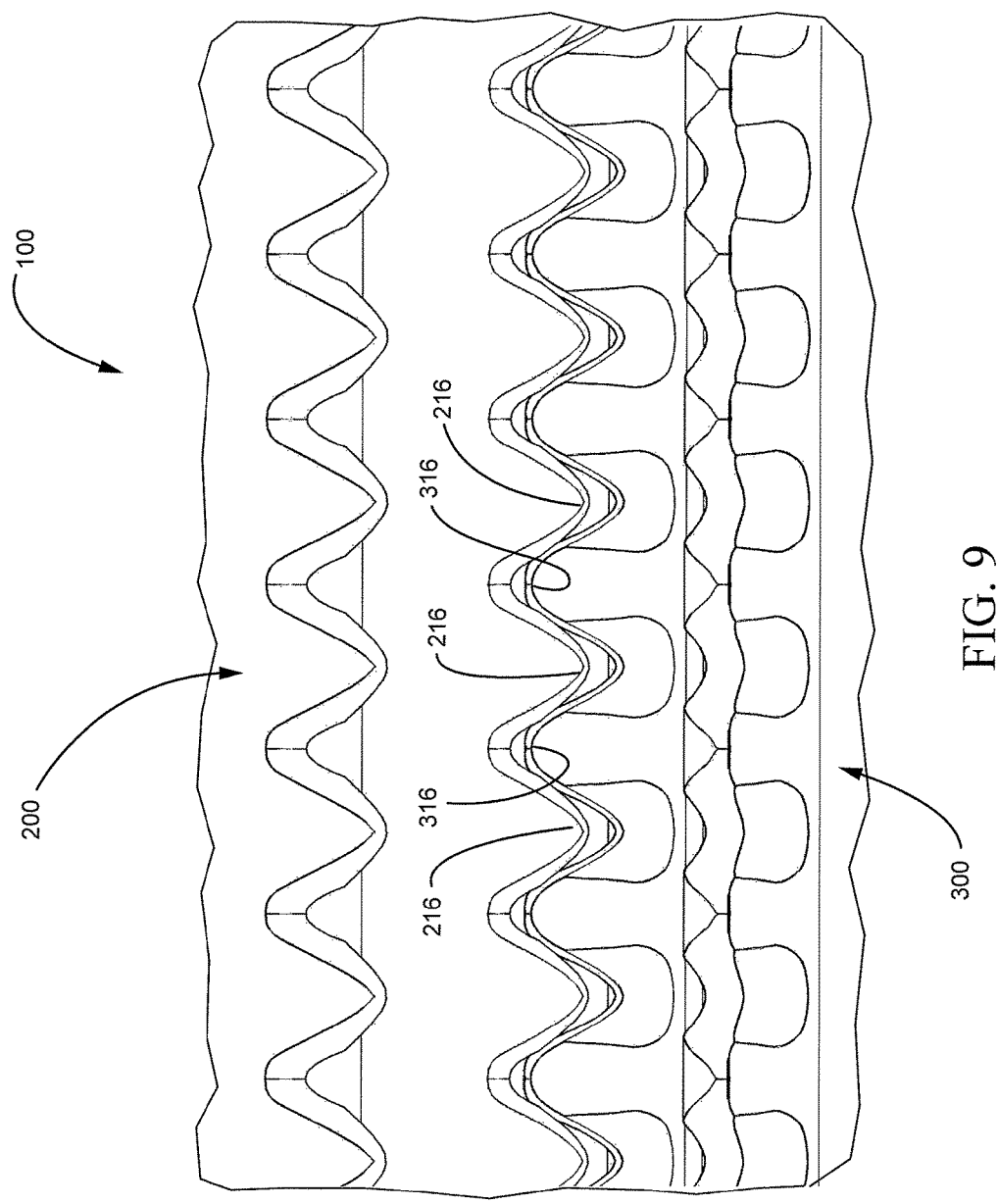
FIG. 9 is an enlarged view of the circled area of FIG. 8 showing the teeth meshing as they rotate past one another.
Figure 24:
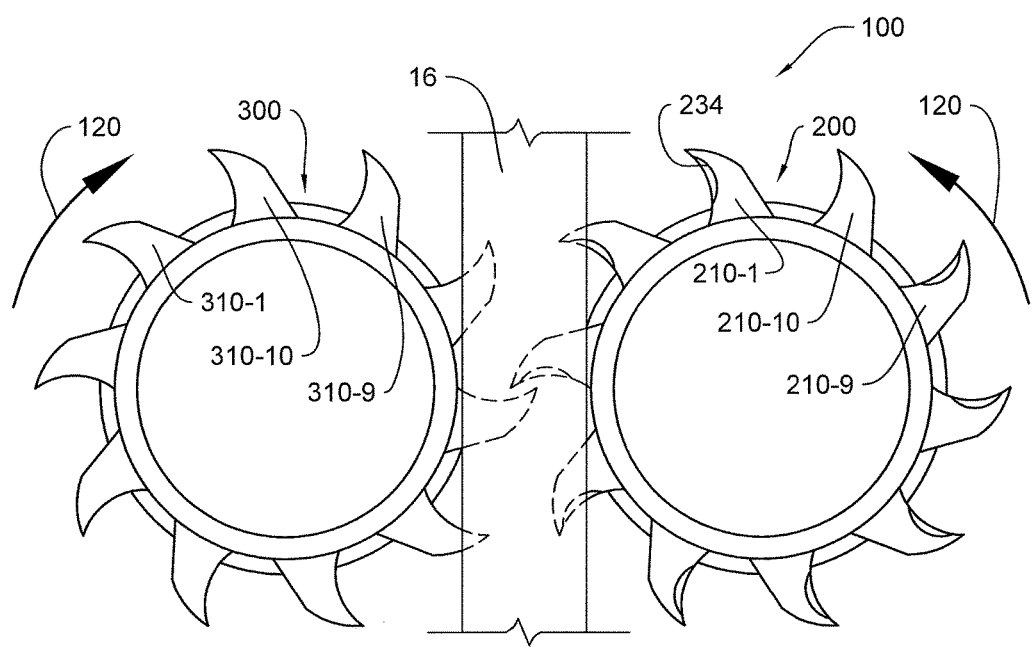
FIGS. 24-26 illustrate the stalk roll assembly of FIG. 7 as the stalk rolls rotate through a cornstalk.
Figure 25:
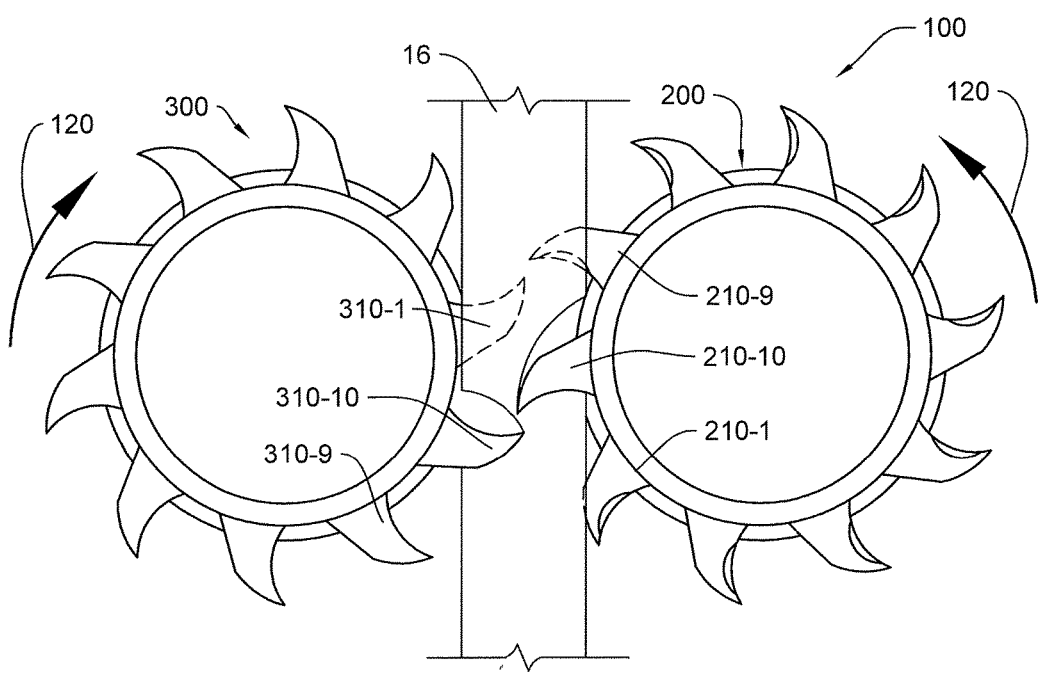
Figure 26:
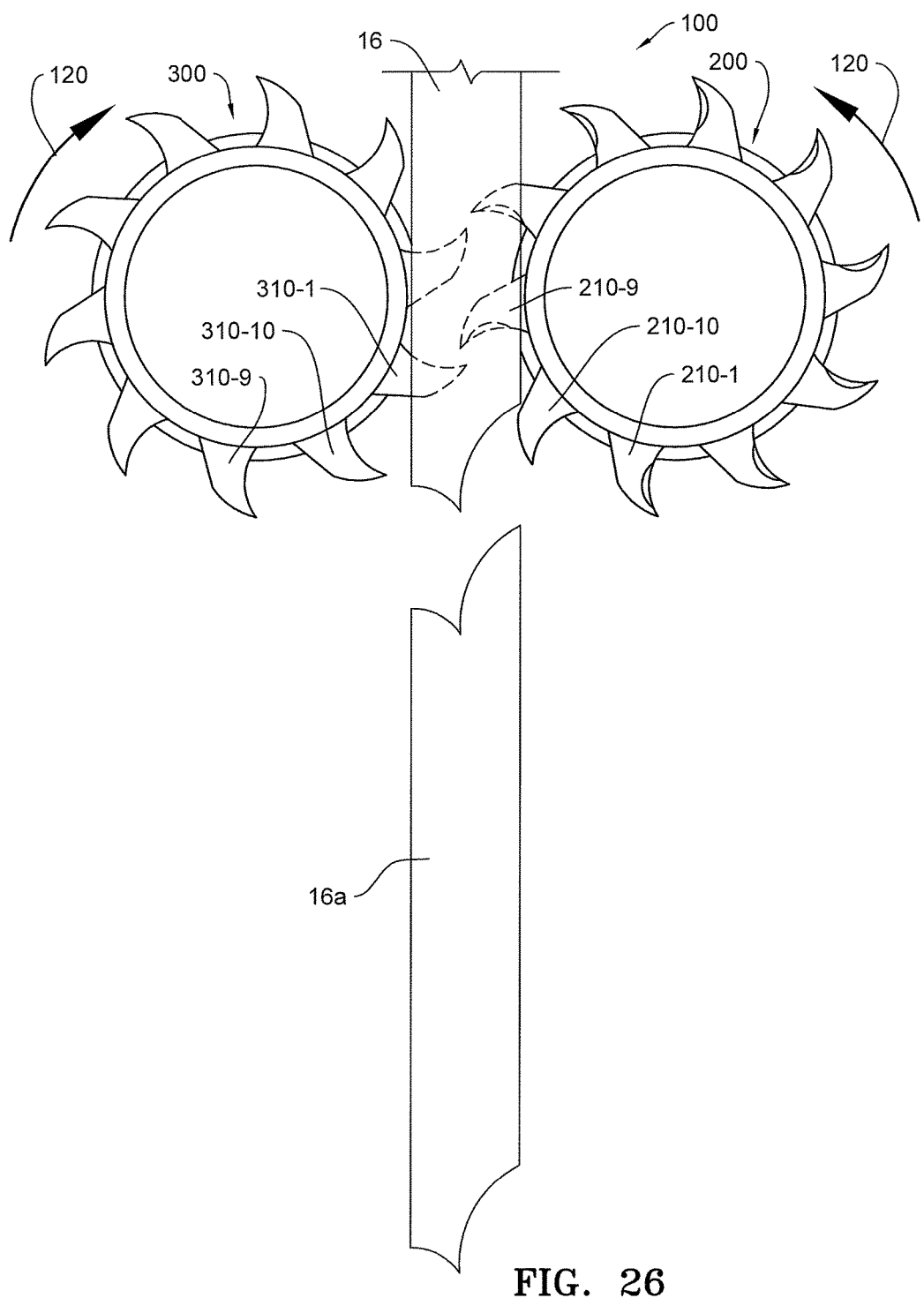

Continuing to refer to FIGS. 7-8 in combination with FIGS. 24-26, the stalk rolls 200, 300 are closely spaced laterally so that the outer edges 214, 314 of the radially extending flutes 210, 310 overlap one another as they rotate. As such, the stalk rolls are timed so that as they rotate past one another, the outer edges 214, 314 of the flutes 210, 310 are received between the opposing flutes of the opposing stalk roll. Additionally, as best illustrated in FIGS. 8 and 9, the teeth 216, 316 of the respective stalk rolls 200, 300 are longitudinally translated or offset from one another so that as the stalk rolls rotate, their respective teeth are not tip to tip, but are instead aligned so the teeth will mesh with each other wherein the tips of the teeth are received in the valleys between the opposing teeth of the opposing stalk roll as they rotate past one another.

The cylindrical body 204, 304 includes a flared rearward end 220, 320. The flared ends 220, 320 mate with the flared ends of the corresponding drive shafts of the row unit assembly 30. The flutes 210, 310 are blunted and taper into the flared ends. The flared ends and blunted flutes may help the smallest diameter portions of the cornstalk toward the tassel to be crushed and chopped in the same manner as the larger diameter portions of the cornstalk near the base as described in more detail below.

Figure 13:
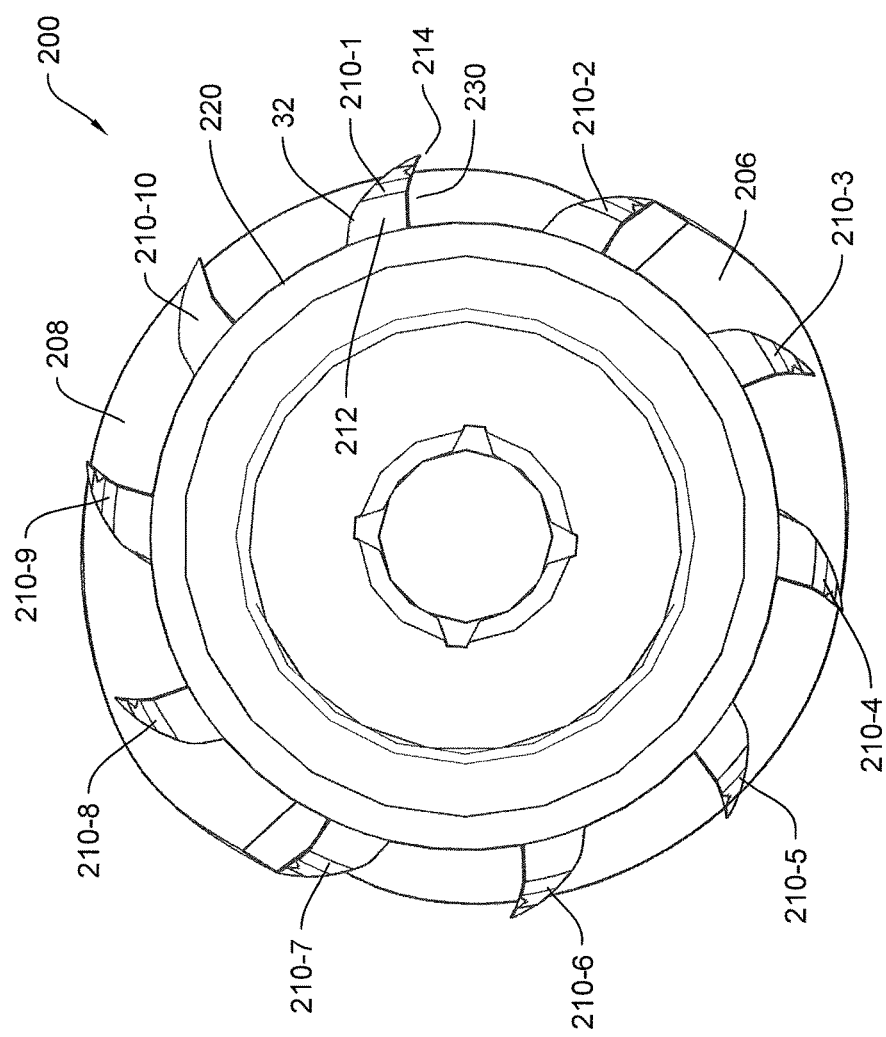
FIG. 13 is a rear elevation view of the stalk roll of FIG. 10.

FIGS. 10-16 illustrate an embodiment of the first stalk roll 200. As best illustrated in FIG. 13, the first stalk roll 200 includes ten flutes 210 identified by reference numerals 210-1 to 210-10. The cutting flute is identified by reference numeral 210-10 and the remaining puncturing flutes identified by reference numerals 210-1 to 210-9. As best illustrated in FIGS. 11 and 14-16, each tooth 216 of the puncturing flutes 210-1 to 210-9 includes a cup 234 in its concave surface 230. The cup 234 smoothly transitions from a shallow depression near the base 212 and at the outer edge 214 toward its deepest point at the middle of the concave surface 230. The cup 234 also smoothly transitions from the sides of each tooth toward the middle, thereby forming a cupped tooth.

Figure 10:
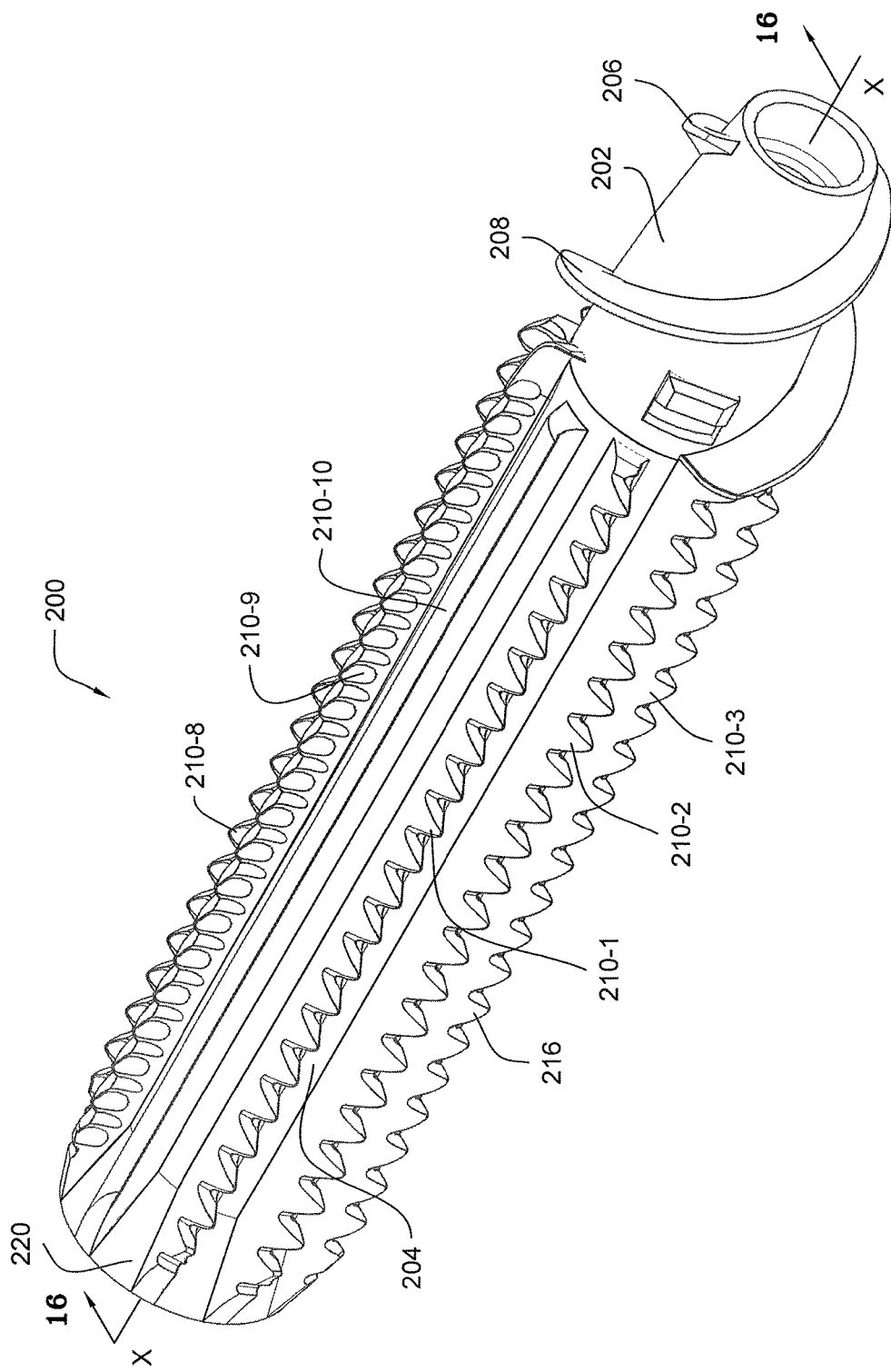
FIG. 10 is a front perspective view of an embodiment of one of the stalk rolls comprising the stalk roll assembly of FIG. 7.
Figure 11:
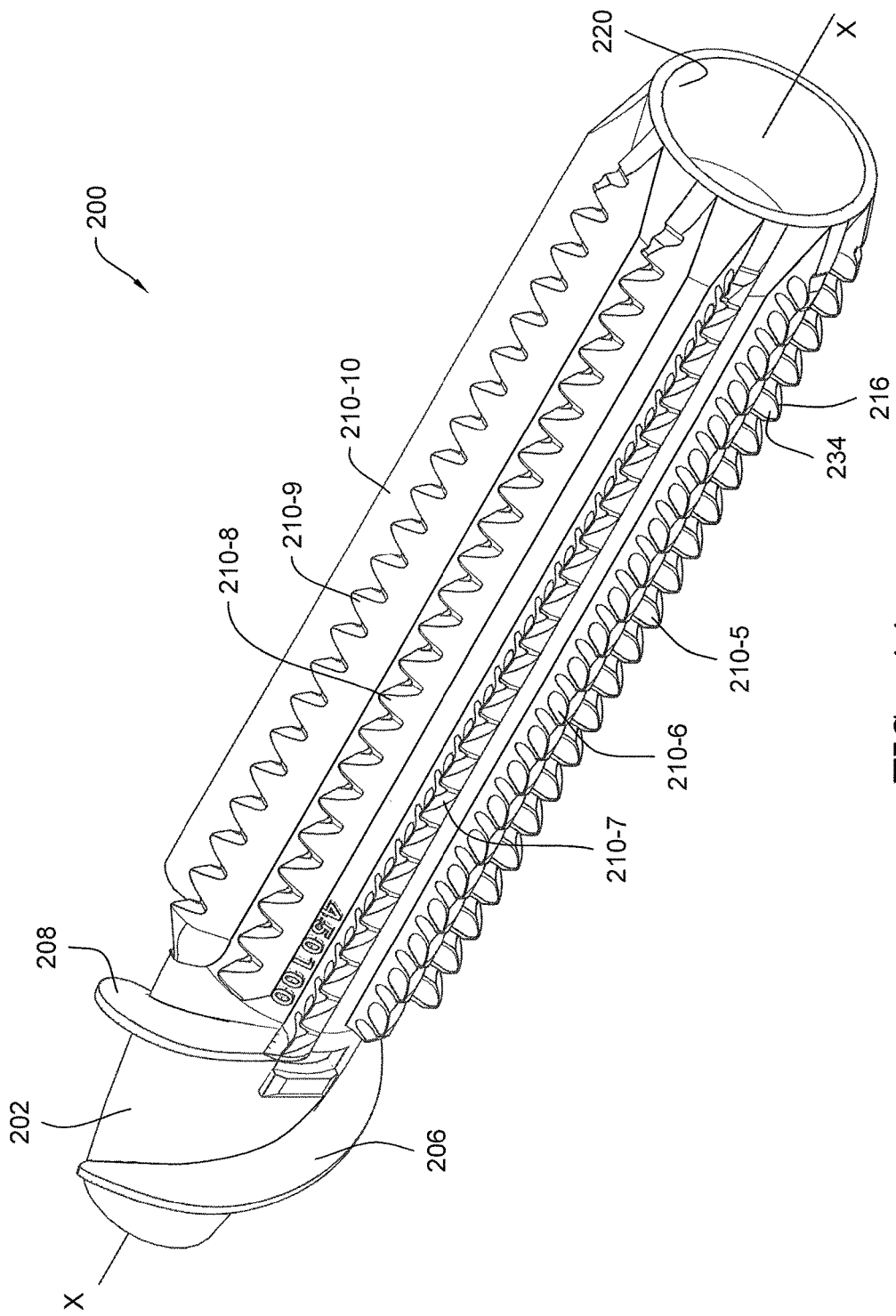
FIG. 11 is a rear perspective view of the stalk roll of FIG. 10.
Figure 12:
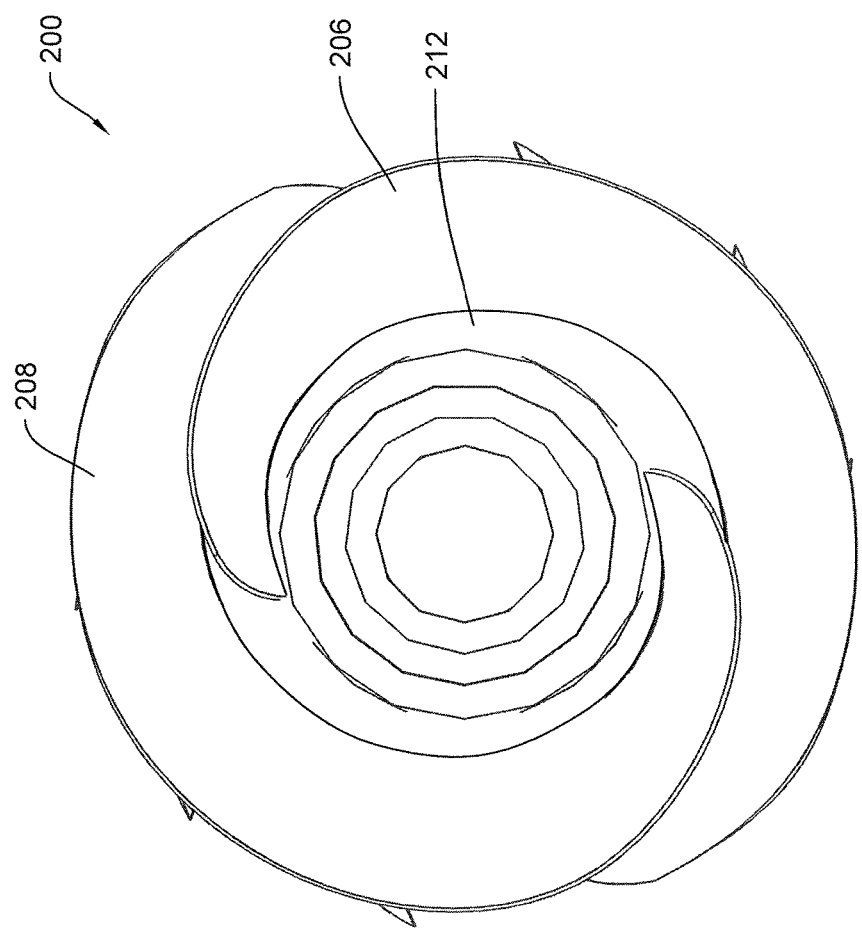
FIG. 12 is a front elevation view of the stalk roll of FIG. 10.
Figure 14:
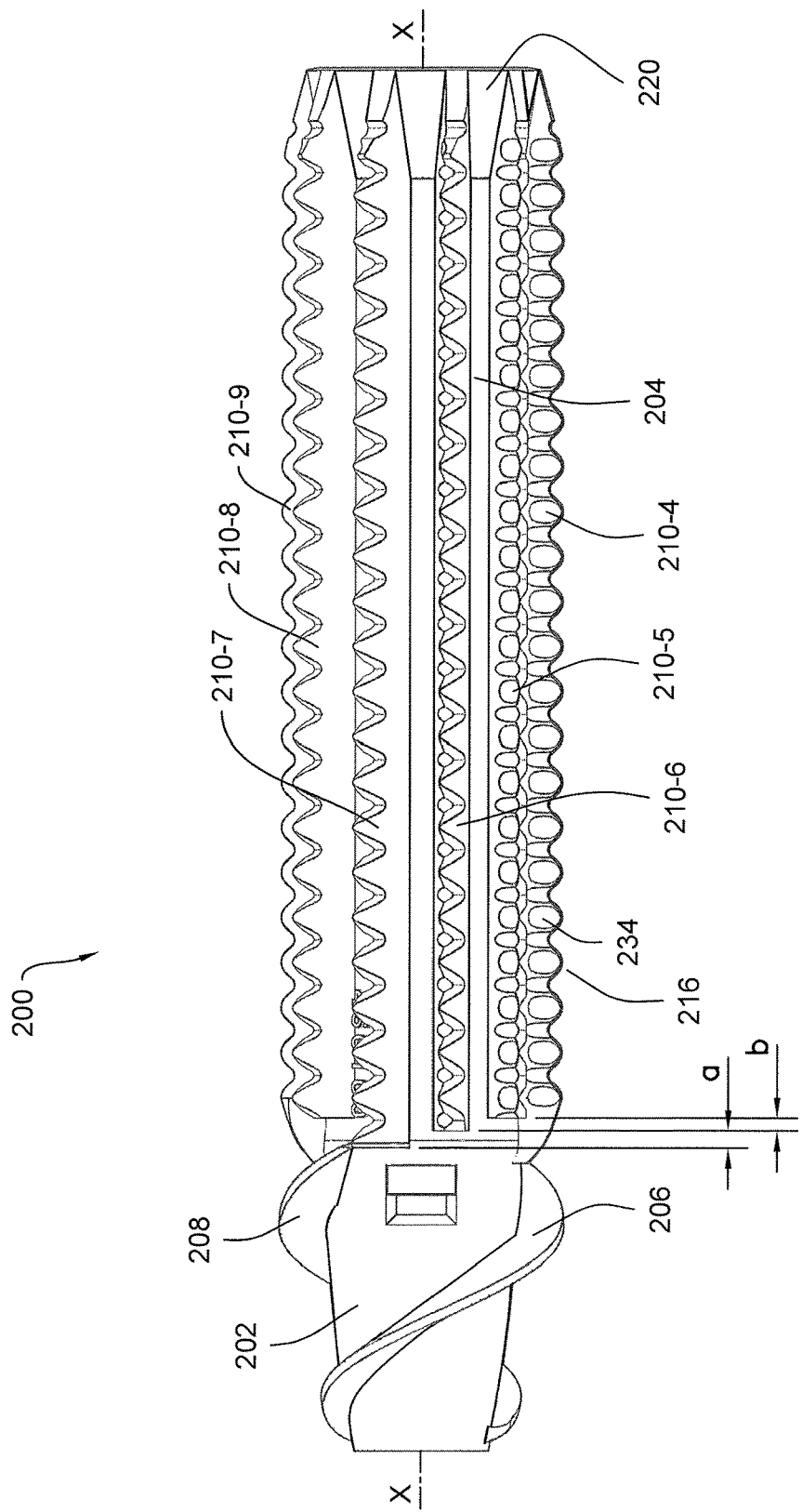
FIG. 14 is a side elevation view of the stalk roll of FIG. 11.
Figure 15:
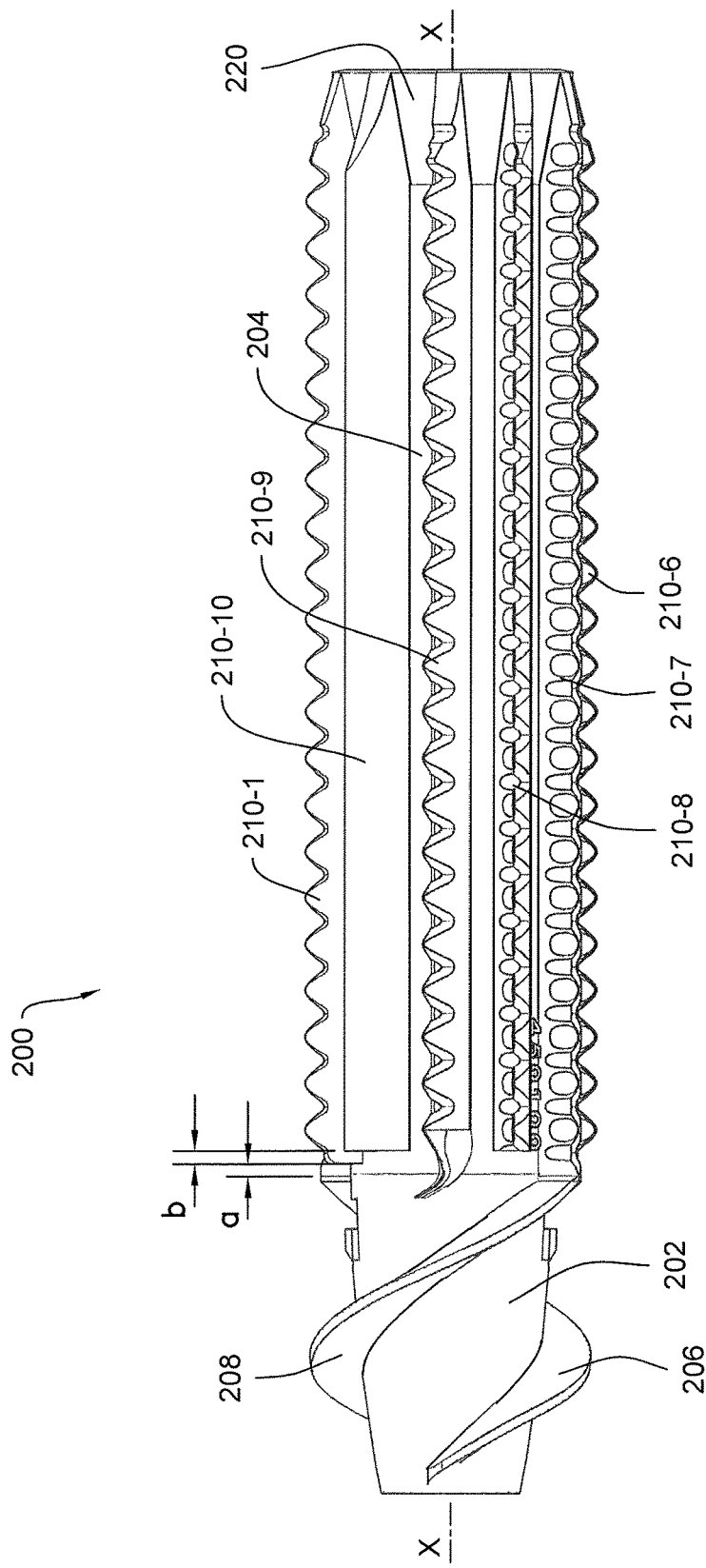
FIG. 15 is a top plan view of the stalk roll of FIG. 11.
Figure 16:
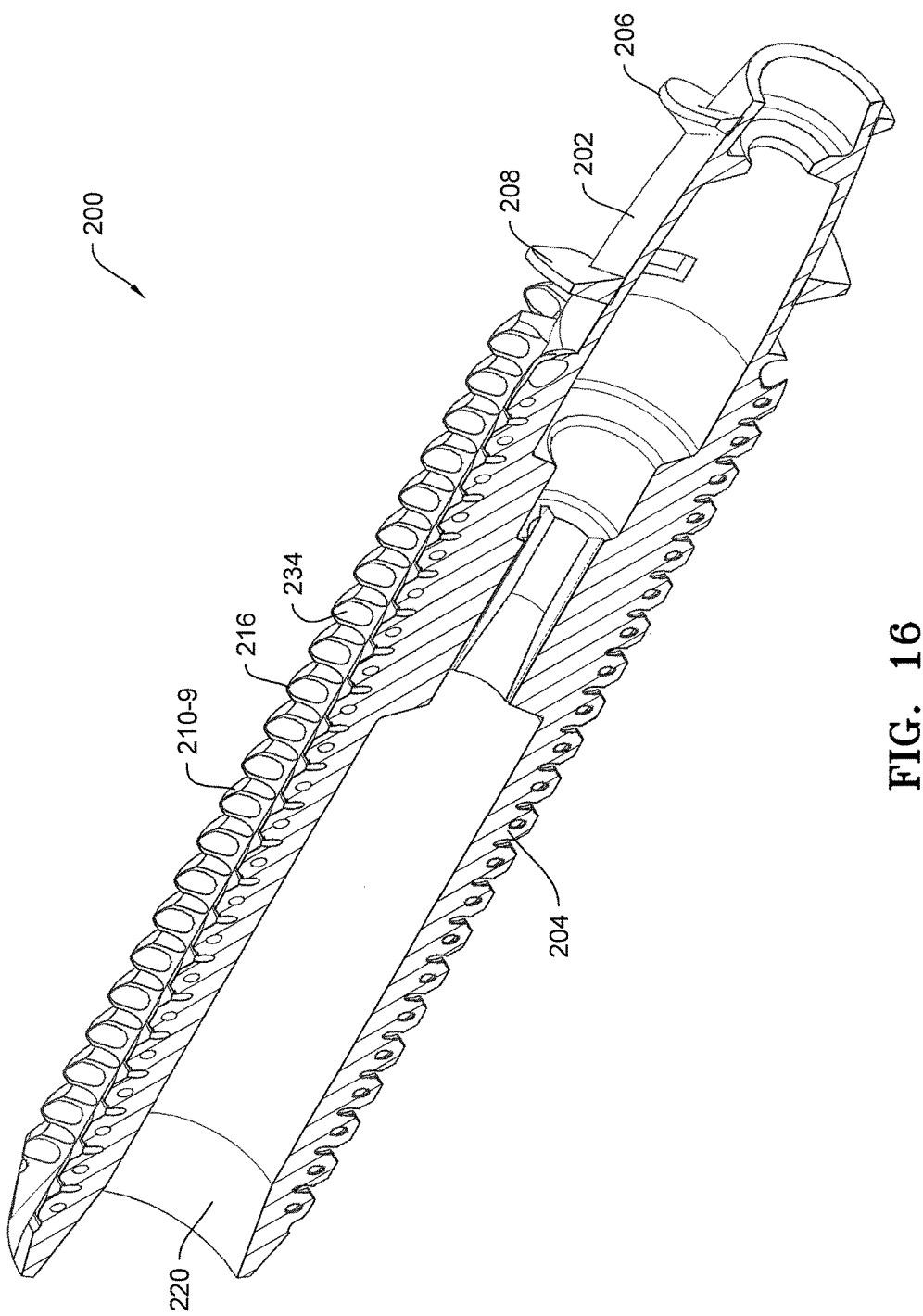
FIG. 16 is a cross-sectional perspective view of the stalk roll of FIG. 10 as viewed along lines 16-16 of FIG. 10.
Figure 17:
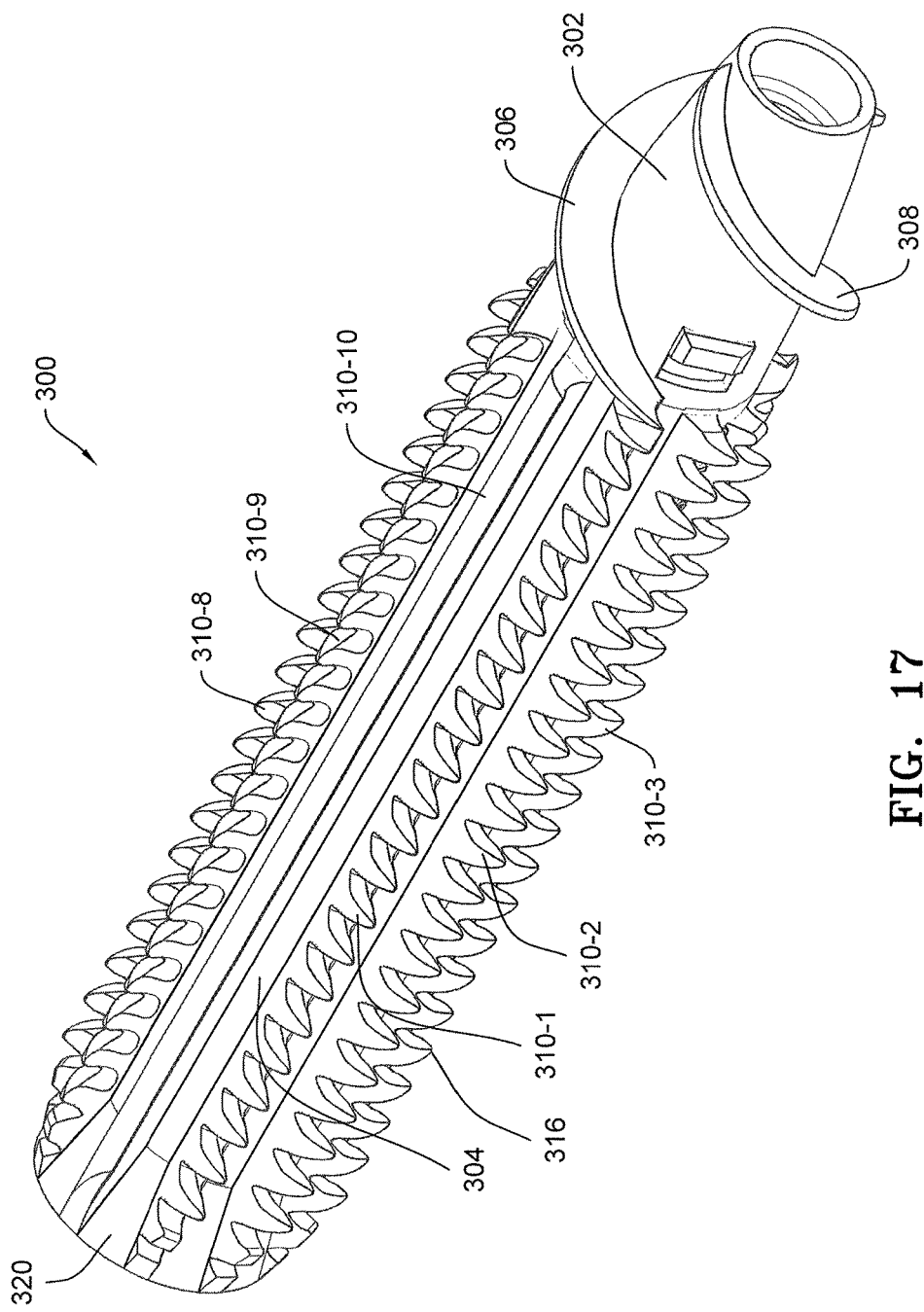
FIG. 17 is a front perspective view of an embodiment of the other stalk roll comprising the stalk roll assembly of FIG. 7.
Figure 18:
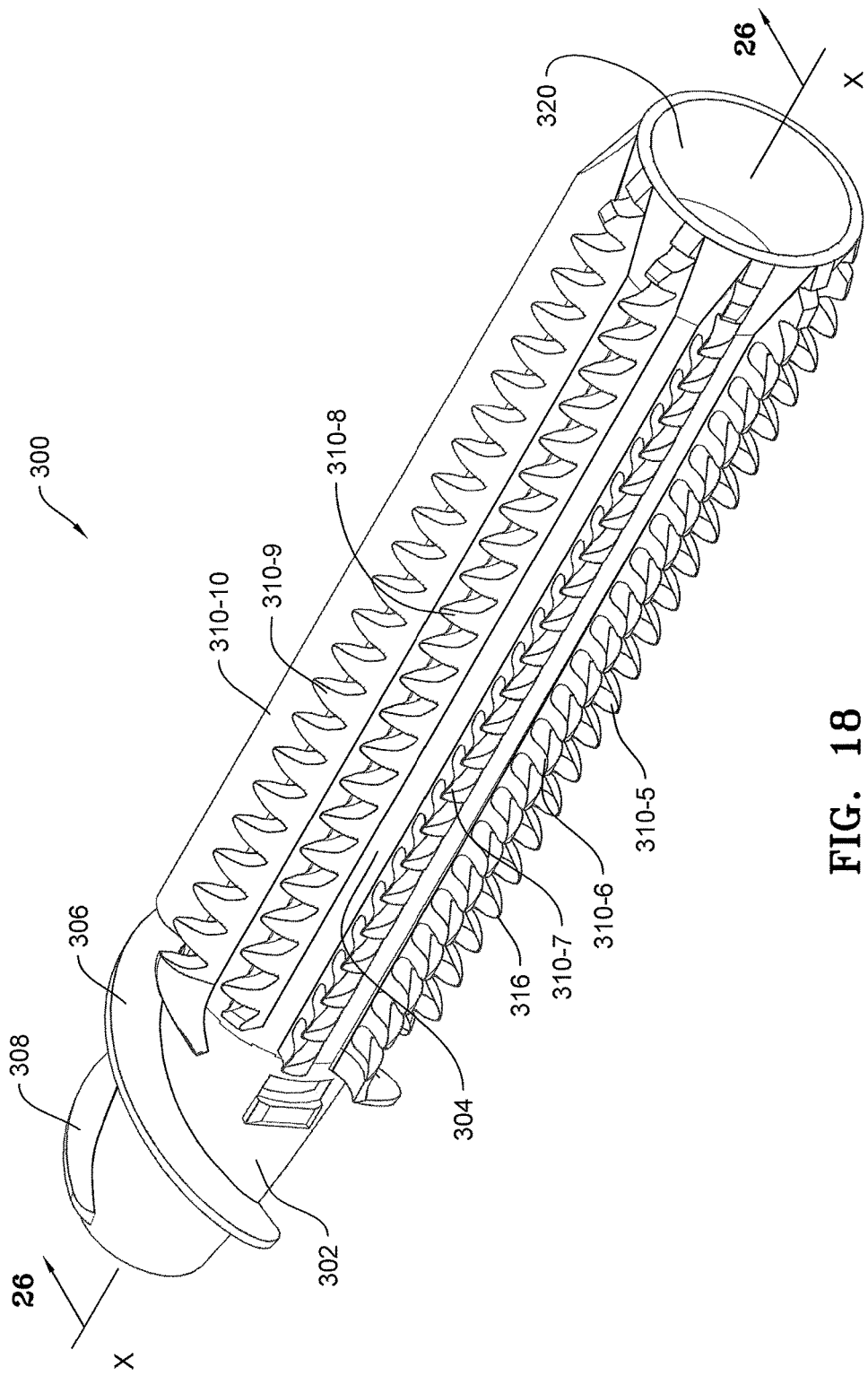
FIG. 18 is a rear perspective view of the stalk roll of FIG. 17.
Figure 19:
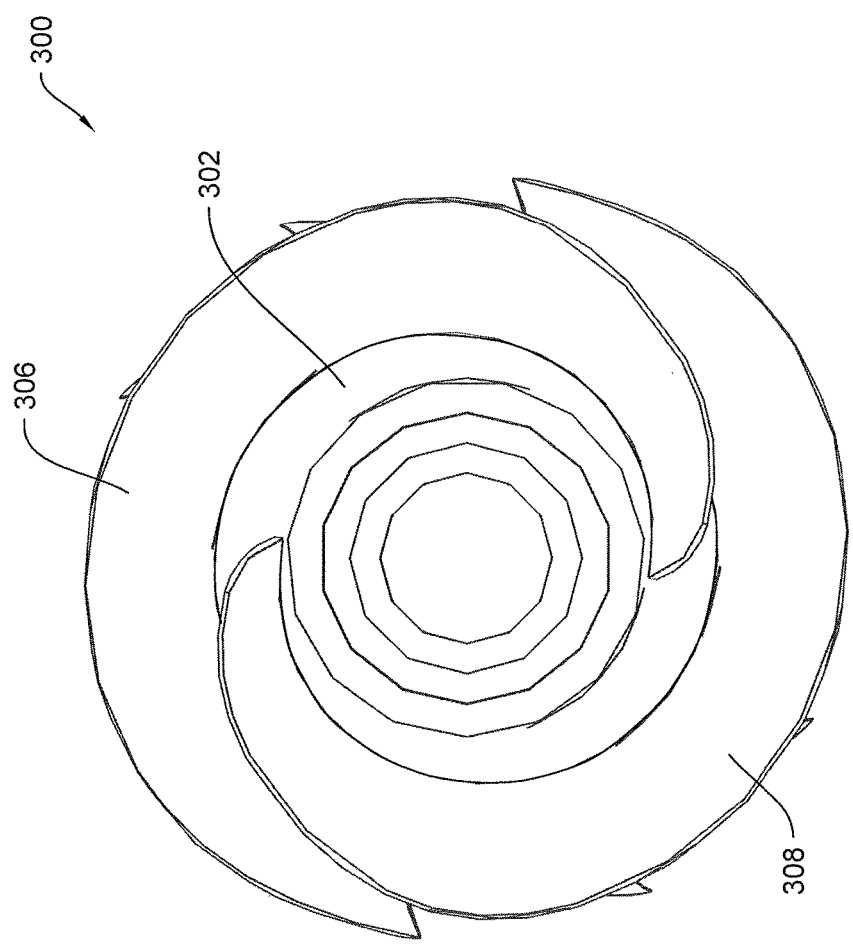
FIG. 19 is a front elevation view of the stalk roll of FIG. 17.

As best shown in FIGS. 10 and 13 and 15, at the interface of the nose 202 and body 204, each of the two flights 206, 208 transitions without a break into the flutes 210-2 and 210-7. As best shown in FIGS. 10, 14 and 15, two of the flutes 210-4 and 210-9 extend a short distance forwardly beyond the cylindrical body 204 and taper into the nose 202 in the same helical direction as the flights 206, 208. The forward ends of the flutes 210 which do not transition into the nose 202 are stepped or staggered with respect to one another as indicated by horizontal dimension lines "a", "b" in FIGS. 14 and 15.

Figure 20:
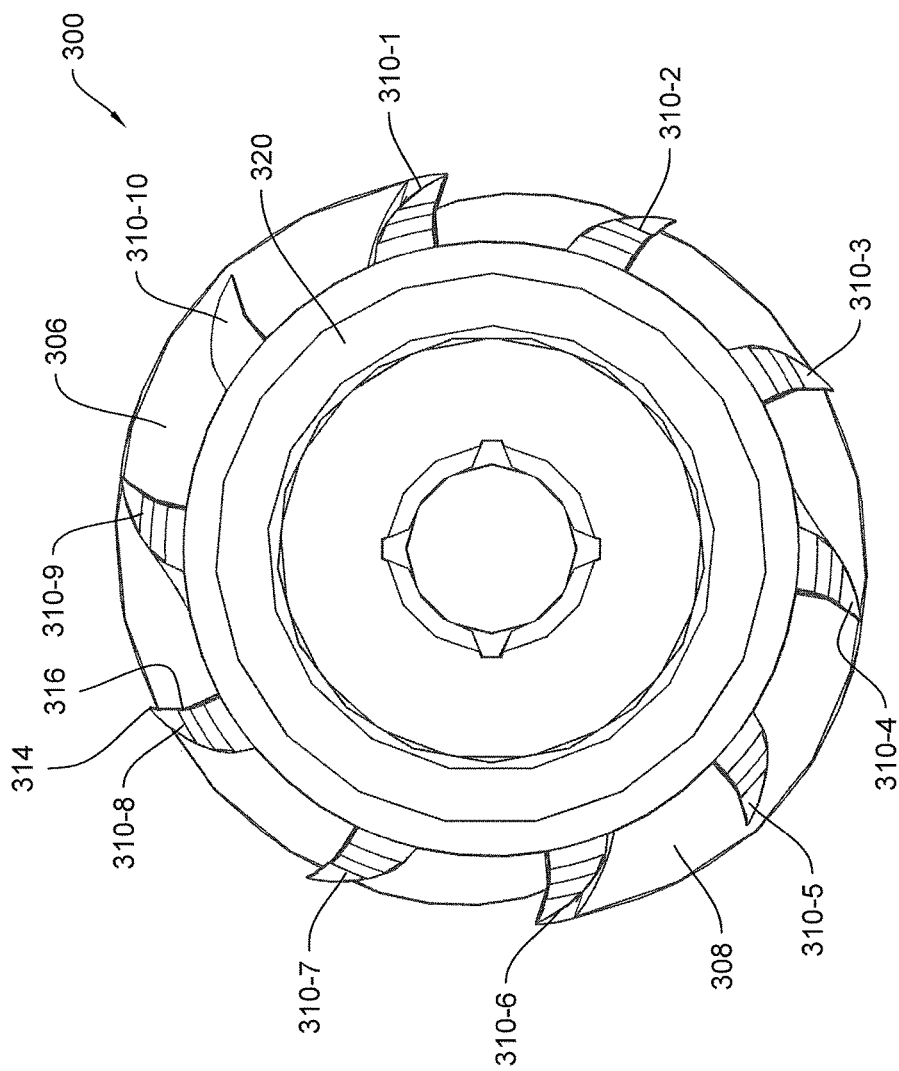
FIG. 20 is a rear elevation view of the stalk roll of FIG. 17.

FIGS. 17-23 separately illustrate an embodiment of the second stalk roll 300. Referring to FIG. 20, similar to the first stalk roll 200, the second stalk roll 300 200 includes ten flutes 310 identified by reference numerals 310-1 to 310-10. The cutting flute is identified by reference numeral 310-10 and the remaining puncturing flutes identified by reference numerals 310-1 to 310-9. However, unlike the teeth 216 of the first stalk roll 200, the teeth of the second stalk roll are not cupped. Comparing FIGS. 14 and 21, it should also be appreciated that the cupped teeth 216 of the first stalk roll 200 have a much more rounded outer edge and shallower valley between the teeth than the more sharply rounded and deeper valleyed teeth 316 of the second stalk roll 300.

Figure 21:
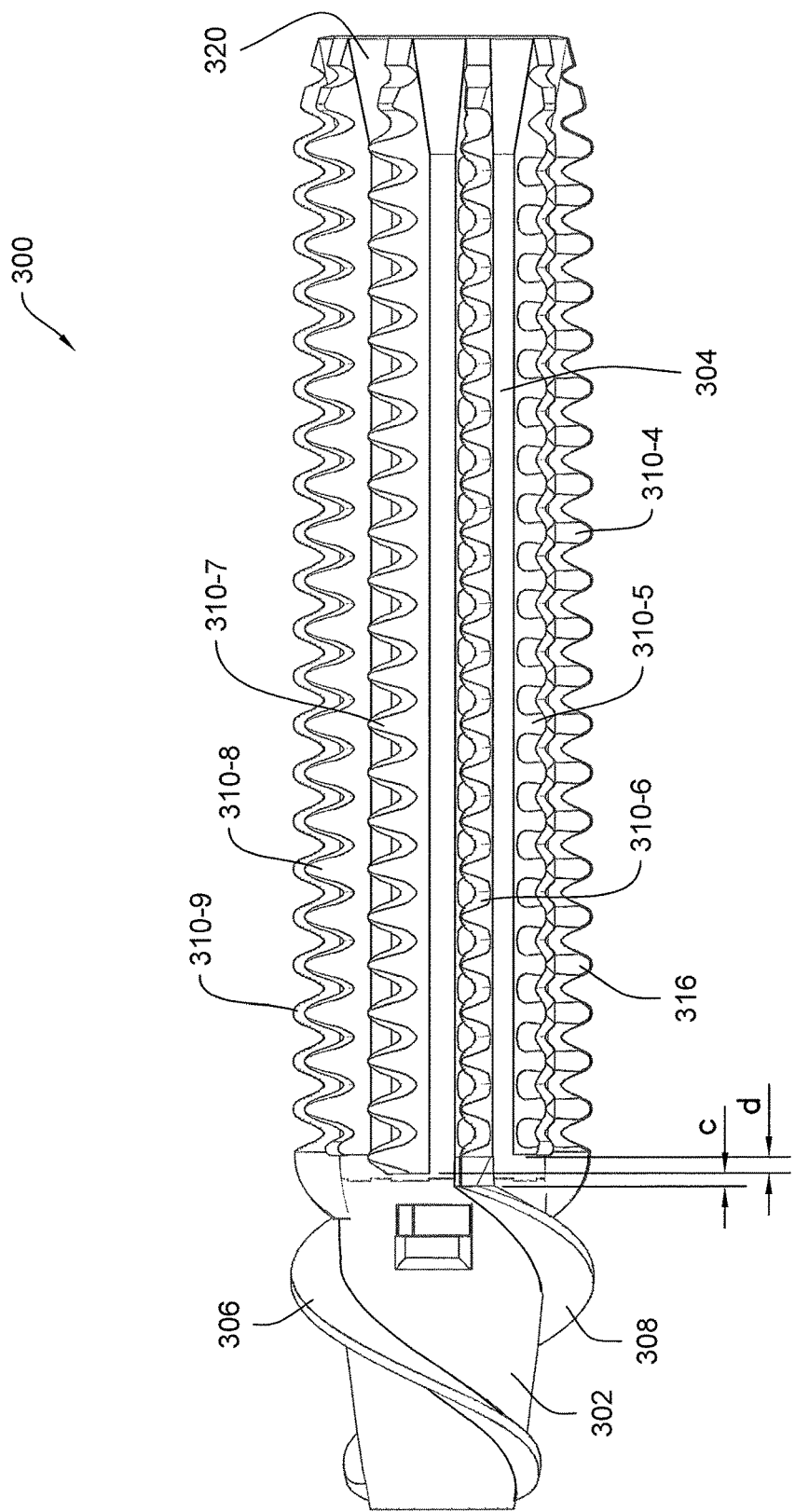
FIG. 21 is a side elevation view of the stalk roll of FIG. 18.
Figure 22:
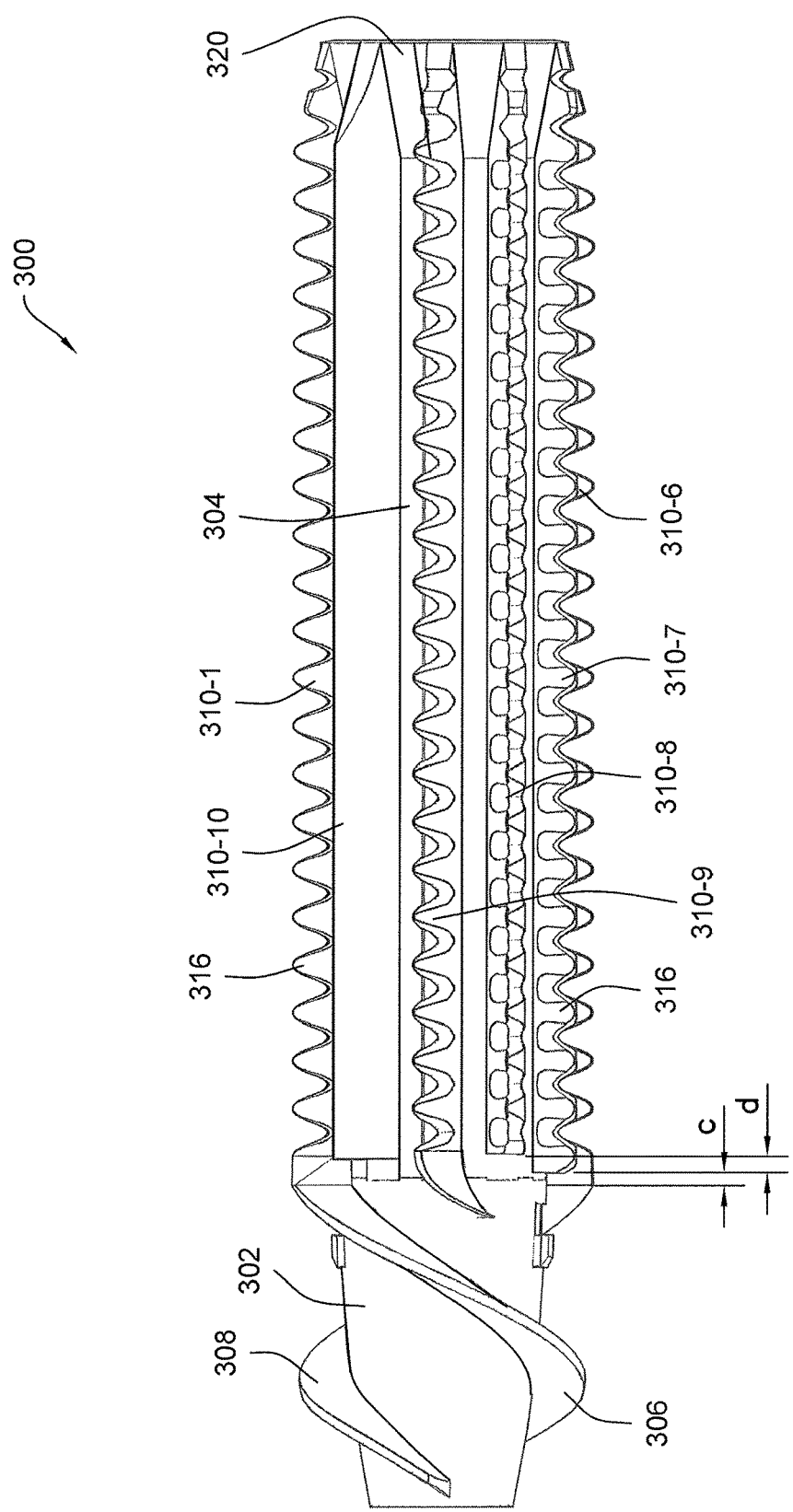
FIG. 22 is a top plan view of the stalk roll of FIG. 18.
Figure 23:
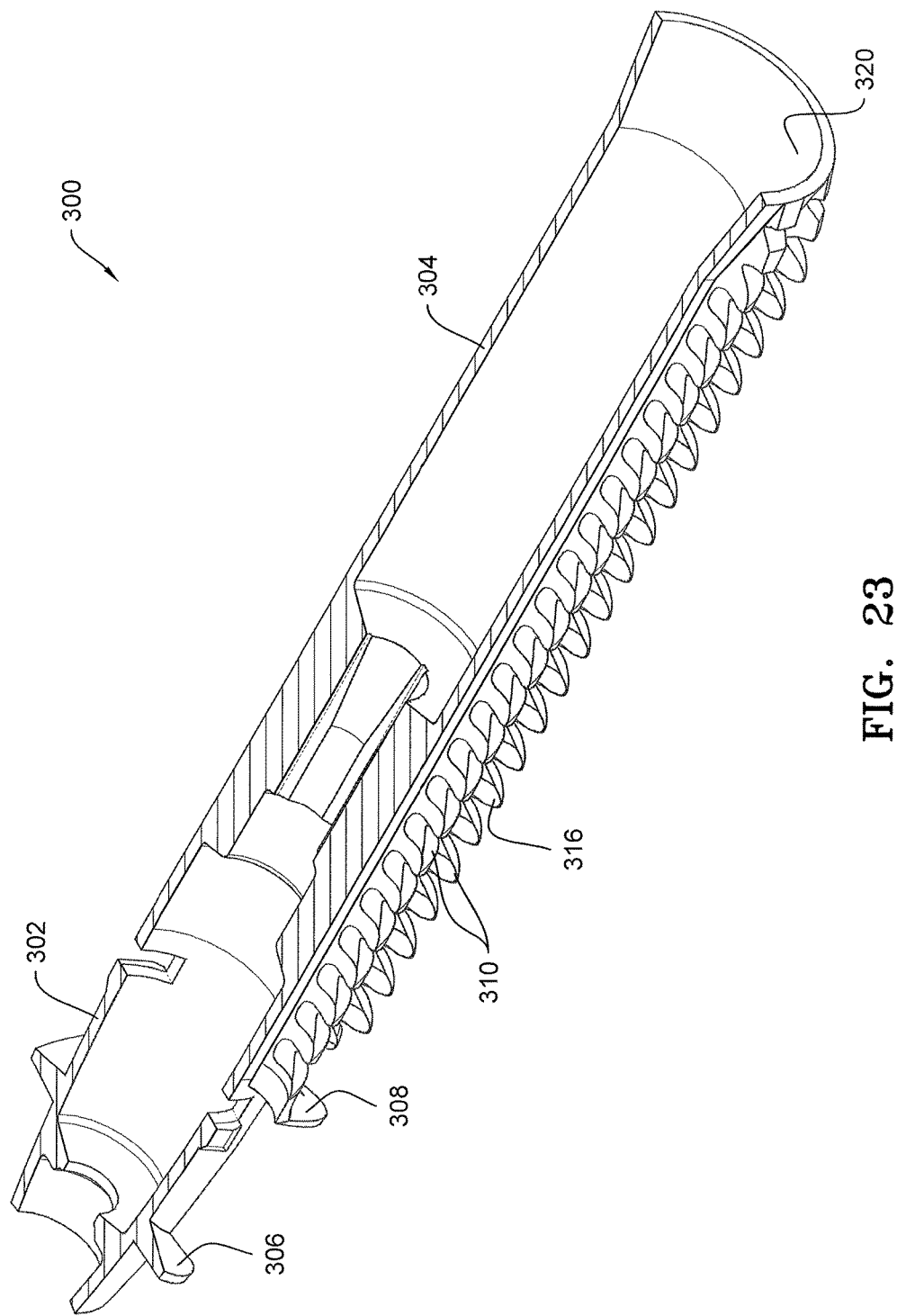
FIG. 23 is a cross-sectional perspective view of the stalk roll of FIG. 18 as viewed along lines 23-23 of FIG. 18.

Also, similar to the first stalk roll 200, the flights 306, 308 transitions without a break into two flutes 310-1 and 310-6. Comparing FIGS. 13 and 20, it should be appreciated that the flight-to-flute transitions for the second stalk roll 300 are rotated one flute counter-clockwise the with respect to the first stalk roll 200 (at flutes 210-2 and 210-7) of to avoid interference between the flights 206, 208 and 306, 308 as they rotate past one another. Referring to FIGS. 21 and 22, two of the flutes 310-4 and 310-9 extend a short distance forwardly beyond the cylindrical body 304 and taper into the nose 302 in the same helical direction as the flights 306, 308 in the same manner as in the first stalk roll 200. The forward ends of the flutes 310 which do not transition into the nose 302 are also stepped or staggered with respect to one another as indicated by horizontal dimension lines "c", "d" in FIGS. 21 and 22.

It has been found that stalk rolls with the foregoing flight-to-flute transition and the stepped flute ends improves capturing of the cornstalks 16 between the flights 206, 208 and 306, 308 of the stalk rolls 200, 300 and effectively move the cornstalks 16 between the cylindrical bodies 204, 304 of the stalk rolls 200, 300 for crushing and shearing by the flutes 210, 310 thereby minimizing the problems encountered with prior art stalk rolls in which the cornstalks stall or hesitate before being pulled between the cylindrical bodies.

In use, as shown in FIGS. 24-26, the stalk rolls 200 rotate in opposite directions as indicated by arrows 120. The stalk rolls 200, 300 are laterally spaced such that their respective flutes 210, 310 overlap as they rotate past one another at about the 3 o'clock and 9 o'clock positions as shown. As previously discussed, the position and rotation of the flutes 210, 310 are timed so the flutes do not make contact with one another as they rotate. The cutting flutes 210-10, 310-10 of each stalk roll 200, 300 are also oriented with respect to one another so that they come together in overlapping relation at about the 3 o'clock and 9 o'clock positions, respectively.

In operation, it should be appreciated that the teeth 216, 316 of the puncturing flutes 210-1 to 210-9 and 310-1 to 310-9 punch into, puncture and/or pulverize the tough fibrous cornstalks as they rotate through the cornstalk which is desirable for the reasons identified below. However, as shown in FIG. 25, when the cutting flutes 210-10, 310-10 rotate through the cornstalk, the straight edge 214, 314 promotes shearing of the cornstalk by cutting through the cornstalk from each direction producing chopped cornstalk sections 16*a* which are approximately six to eight inches in length with each rotation of the cutting flutes 210-10, 310-10.

It has been found that cornstalk sections that are six to eight inches in length are more easily swept aside by the row cleaners of the planter during the next planting season resulting in a furrow and seed bed free of crop residue.

Through testing it has also been found that the cups 234 and more blunted configuration of the teeth 216 of the first stalk roll 200 which mesh with the sharper and deeper valleyed configuration of the teeth 316 of the second stalk roll 300 promote horizontal and vertical fracturing of the cornstalk.

Accordingly, the stalk roll assembly 100 produces crop residue that is sufficiently fractured and pulverized to promote uniform decomposition while still having enough integrity to keep the pulverized stalk sections together so it remains the ideal length for being easily swept aside by row cleaners during the next planting season. The more uniform decomposition may result in a more uniform release of nitrogen throughout the life of the next crop and reduce nitrogen immobilization during the critical early growing stages of the next season's crop.

In an alternative embodiment, rather than the stalk roll assembly 100 being comprised of one each of the first and second stalk rolls 200, 300, it should be appreciated that the stalk roll assembly 100 may be comprised of a pair of first stalk rolls 200 (i.e., each configured with the more blunted or rounded cupped teeth 216). Alternatively, the stalk roll assembly 100 may be comprised of a pair of second stalk rolls 300 (i.e., each configured with the more sharply rounded teeth 316). It being understood that in such embodiments where a pair of stalk rolls 200, 300 are used, one of the stalk rolls comprising the pair would have oppositely twisting helical flights as the other, and the flight-to-flute transition would be rotated from the other stalk roll comprising the pair for the reasons identified above.

Figure 27:
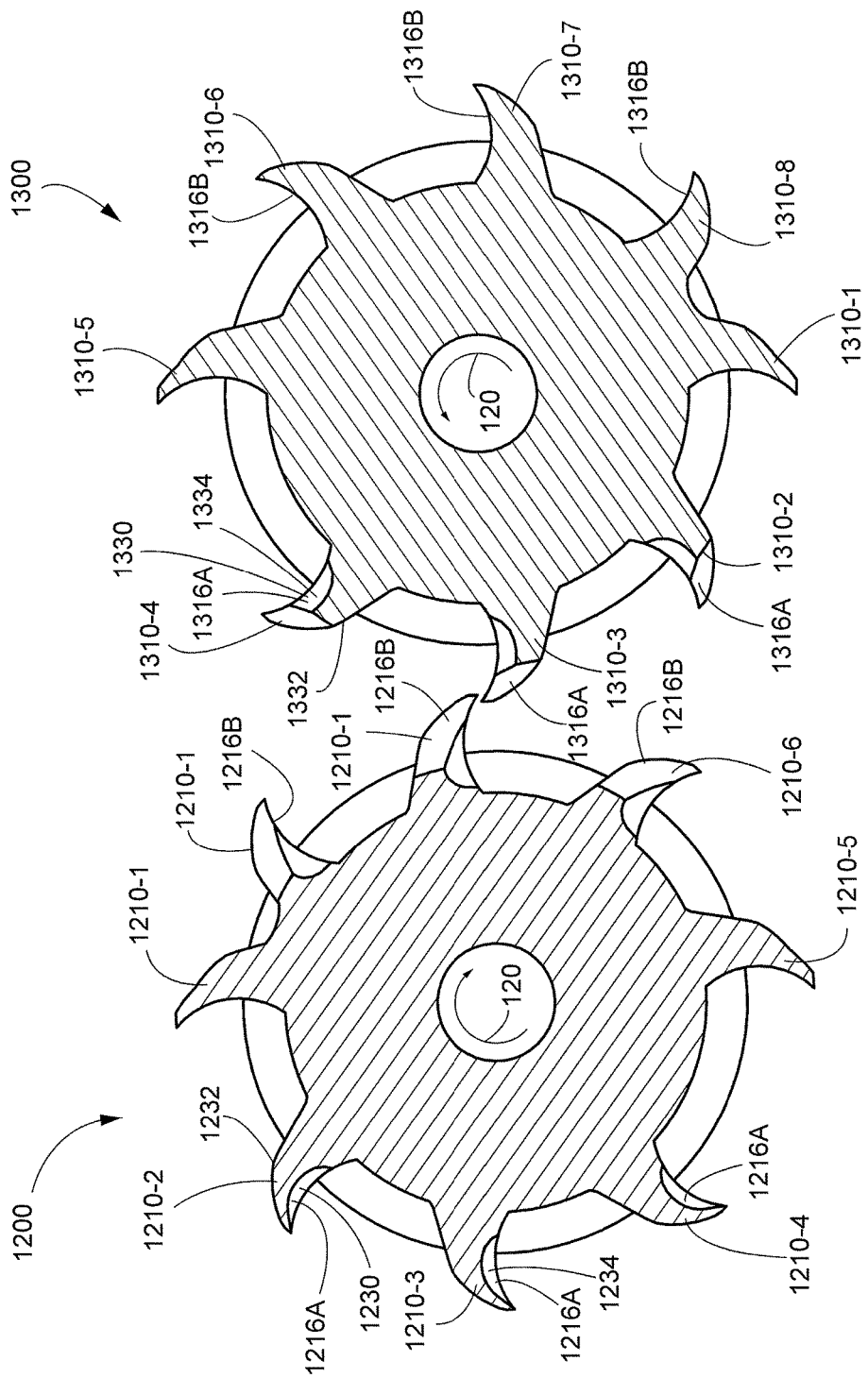
FIG. 27 illustrates another embodiment of a stalk roll assembly comprising first and second stalk rolls.
Figure 28:
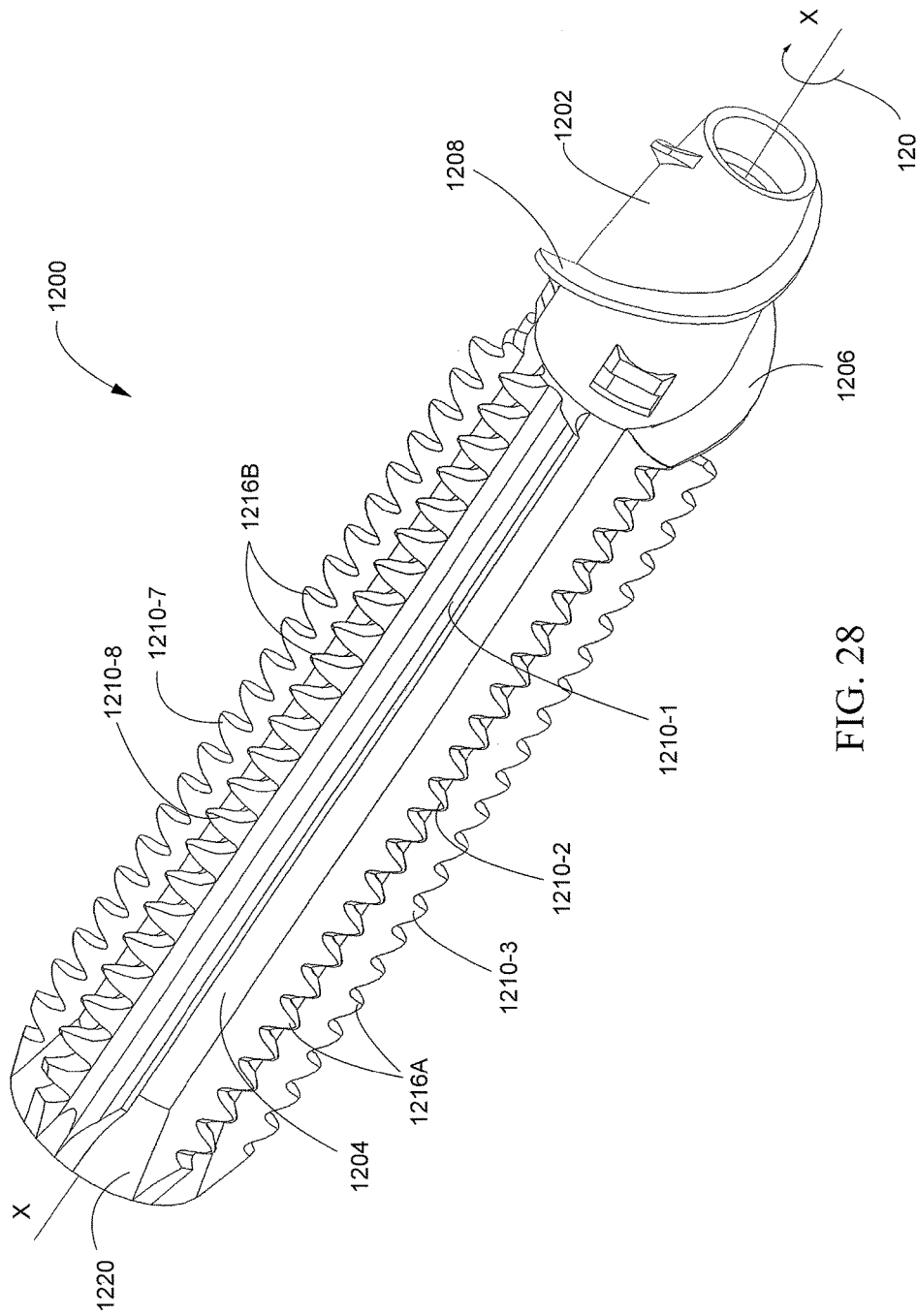
FIG. 28 is a front perspective view of the left stalk roll as viewed in FIG. 27.
Figure 29:
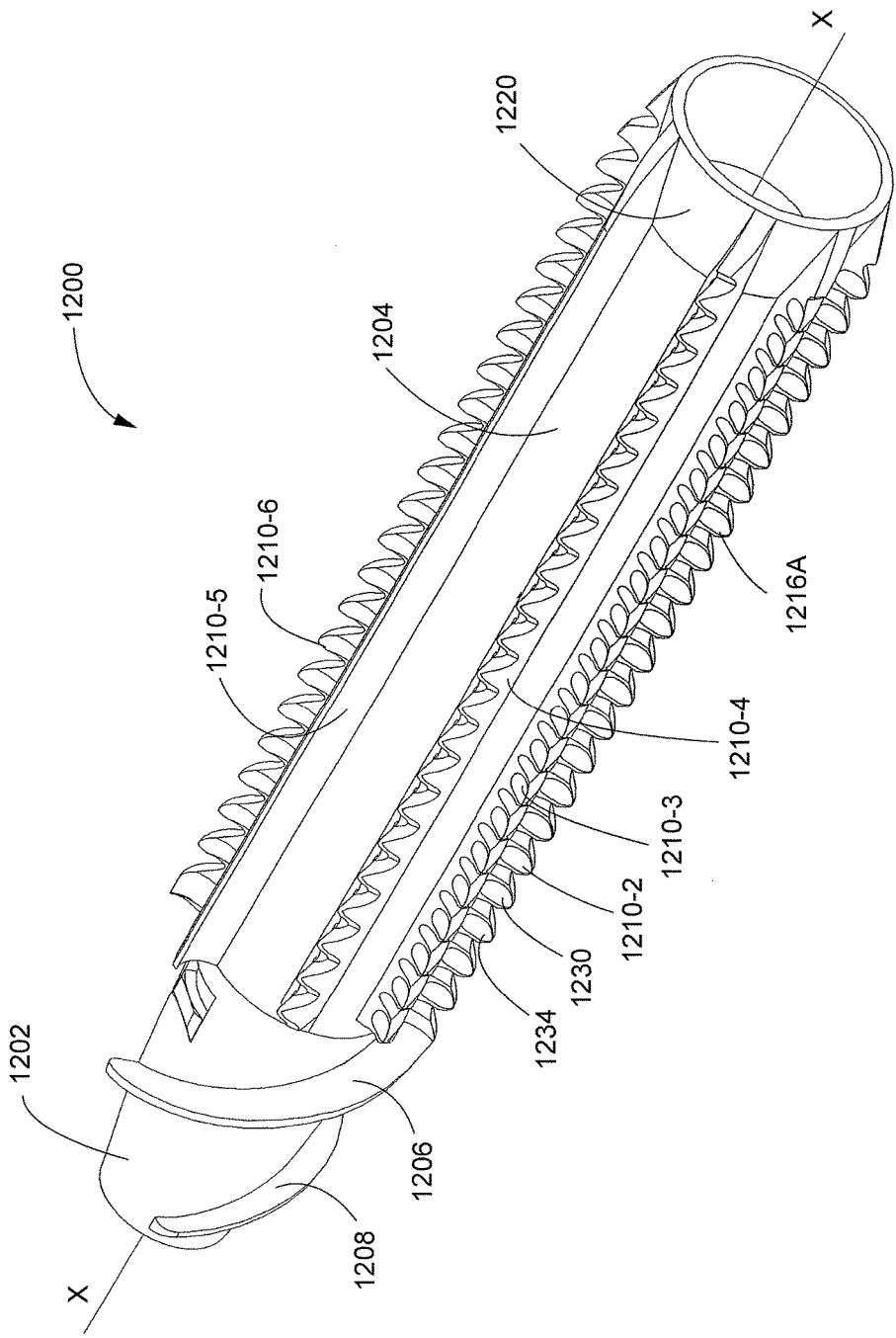
FIG. 29 is a rear perspective view of the left stalk roll of FIG. 28.
Figure 30:
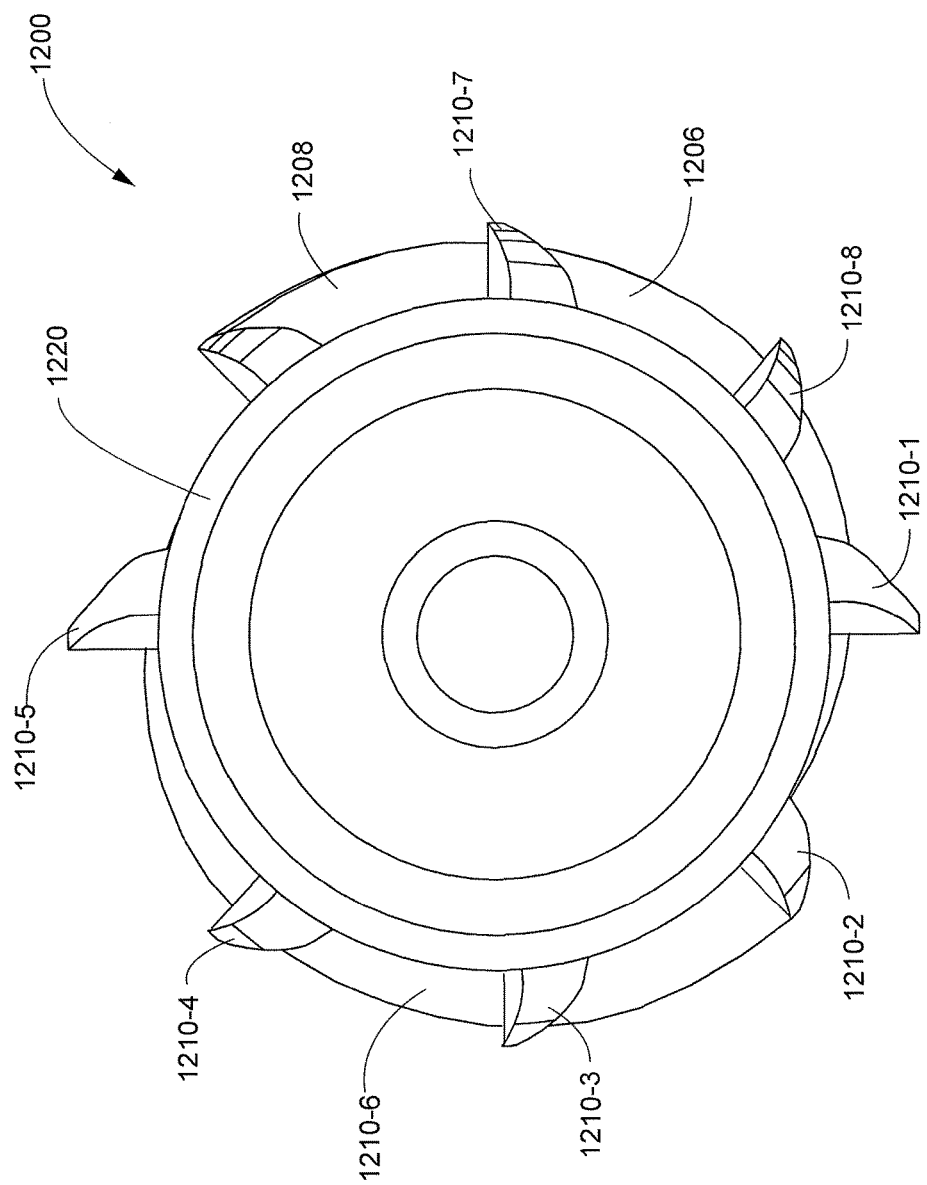
FIG. 30 is a rear elevation view of the left stalk roll of FIG. 28.

FIG. 27 shows another embodiment of a stalk roll assembly 1000 comprising first and second adjacently spaced stalk rolls 1200, 1300 which may form part of a row unit 30 of an OEM or as a replacement stalk roll assembly for purposes of retrofitting an OEM row unit 30. As with the previously described embodiment 100, in this embodiment 1000 the stalk rolls 1200, 1300 are removably secured in a conventional manner to drive shafts (not shown) which extend forwardly from a frame member 31 of the row unit assembly 30.

In operation, each of the stalk rolls 1200, 1300 rotate about their respective longitudinal axis in the direction indicated by arrow 120. As with the previously described embodiment 100, in this embodiment 1000, the stalk rolls 1200, 1300 are configured to cooperate to achieve high throughput of the cornstalks, leaves, husks, etc., while also ensuring that the cornstalks are crushed along their length in more than one direction and chopped in lengths preferably between six to eight inches in length.

Consistent with the previously described embodiment 100, in the description of this alternative embodiment 1000, the common features of both stalk rolls 1200, 1300 are described together with reference numerals in the 1200-series referring to the feature of the first stalk roll 1200 and reference numerals in the 1300-series referring to the features of the second stalk roll 1300.

Each stalk roll 1200, 1300 has a frusto-conical nose 1202, 1302 which transitions into an elongated substantially cylindrical body 1204, 1304. The nose 1202, 1302 includes a pair of flights 1206, 1208 and 1306, 1308 which extend helically rearwardly toward the cylindrical body 1204, 1304. It should be appreciated that the helical direction of the flights of the respective stalk rolls are opposite one another such that when the stalk rolls 1200, 1300 rotate in the direction indicated by arrows 120, the flights will cooperate to draw the cornstalks rearwardly toward and between the cylindrical bodies 1204, 1304 of the adjacently disposed stalk rolls 1200, 1300.

Each cylindrical body 1204, 1304 includes a plurality of flutes 1210, 1310 extending radially outwardly and spaced around the circumference of the body 1204, 1304 and which extend along the length of the body 1204, 1304 in substantially parallel relation. As best illustrated in FIG. 27, unlike the first embodiment 100, in this embodiment 1000, not all of the flutes 1210, 1310 are equidistantly spaced around the circumference of the body 1204, 1304.

Each of the flutes 1210, 1310 are wide at their base 1212, 1312 and get progressively narrower as they curve or hook toward the outer edge 1214, 1314 resulting in concave surface 1230, 1330 and a convex surface 1232, 1332. Additionally, unlike the first embodiment 100, in this embodiment 1000, half of the flutes 1210, 1310 are oriented to curve or hook toward the direction of rotation of the stalk roll (designated by arrow 120) and half of the flutes 1210, 1310 are oriented to curve or hook away from the direction of rotation of the stalk roll. Thus, as best illustrated in FIG. 27, each stalk roll 1200, 1300 has two flutes with their convex surfaces 1232, 1332 oriented back-to-back.

Also, unlike the previous embodiment 100 in which each stalk roll 200, 300 had ten flutes 210, 310, in this alternative embodiment 1000, each stalk roll 1200, 1300 includes eight flutes 1210, 1310 identified by reference numerals 1210-1 to 1210-8 and 1310-1 to 1310-8, respectively. Also unlike the previous embodiment 100 in which each stalk roll 200, 300 included only one "cutting flute", in this embodiment 1000, each stalk roll 1200, 1300 include two "cutting flutes" having straight outer edges. In the first stalk roll 1200, the cutting flutes are identified by reference numeral 1210-1 and 1210-5. Likewise in the second stalk roll 1300, the cutting flutes are identified by reference numeral 1310-1 and 1310-5. As best illustrated in FIG. 27, one of the cutting flutes 1210-1, 1310-1 of each of the stalk rolls 1200, 1300 is oriented to curve or hook away from the direction of rotation (designated by arrow 120) of the stalk roll 1200, 1300 and the other cutting flute 1210-5, 1310-5 of each of the stalk rolls 1200, 1300 is oriented to curve or hook toward the direction of rotation of the stalk roll 1200, 1300. The remaining six flutes of each stalk roll 1200, 1300 are "puncturing flutes" each having a serrated edge forming a plurality of spaced teeth 1216, 1316 along its length. The puncturing flutes of the first stalk roll 1200 are identified by reference numerals 1210-2, 1210-3, 1210-4, 1210-6 and 1210-7. Likewise, the puncturing flutes of the second stalk roll 1300 are identified by reference numerals 1310-2, 1310-3, 1310-4, 1310-6 and 1310-7.

As best illustrated in FIG. 27, the stalk rolls 1200, 1300 are closely spaced laterally so that the outer edges 1214, 1314 of the radially extending flutes 1210, 1310 overlap one another as they rotate. As such, the stalk rolls are timed so that as they rotate past one another, the outer edges 1214, 1314 of the flutes 1210, 1310 are received between the opposing flutes of the opposing stalk roll. As in the previous embodiment, the teeth 1216, 1316 of the respective stalk rolls 1200, 1300 are longitudinally translated or offset from one another so that as the stalk rolls rotate, their respective teeth are not tip to tip, but are instead aligned so the teeth will mesh with each other wherein the tips of the teeth are received in the valleys between the opposing teeth of the opposing stalk roll as they rotate past one another.

Unlike the first embodiment 100 in which the puncturing flutes of the first stalk roll 200 had only cupped teeth 216 (i.e., more rounded teeth with a shallow valley between teeth, with each tooth having an indentation or cup 234 in the concave surface 230) and whereas the second flute 300 had only non-cupped teeth 316 (i.e., more sharply rounded teeth with deeper valley between teeth with no indentation in the concave surface 330); in this alternative embodiment 1000, each stalk roll 1200, 1300 includes both a set of cupped teeth 1216A, 1316A and a set of non-cupped teeth 1216B, 1316B. In each of the respective stalk rolls 1200, 1300, the cupped teeth 1216A, 1316A, having indentations or cups 1234, 1334 are oriented to curve or hook away from the direction of rotation of the stalk roll (designated by arrow 120) and the non-cupped teeth 1216B, 1316B are oriented to curve or hook toward the direction of rotation of the stalk roll.

As best illustrated in FIG. 27, the respective stalk rolls are oriented so that the cupped teeth 1216A of the first stalk roll 1200 will rotate through the corn stalk in close relation with the non-cupped teeth 1316B of the second stalk roll 1300. Likewise, therefore, the non-cupped teeth 1216B of the first stalk roll 1200 will rotate through the corn stalk in close relation with the cupped teeth 1316A of the second stalk roll 1300.

The cylindrical body 1204, 1304 of each stalk roll 1200, 1300 includes a flared rearward end 1220, 1320. The flared ends 1220, 1320 mate with the flared ends of the corresponding drive shafts of the row unit assembly 30. The flutes 1210, 1310 are blunted and taper into the flared ends. The flared ends and blunted flutes may help the smallest diameter portions of the cornstalk toward the tassel to be crushed and chopped in the same manner as the larger diameter portions of the cornstalk near the base as described in more detail below.

FIGS. 28-31 illustrate an embodiment of the first stalk roll 1200. At the interface of the nose 1202 and body 1204 of the first stalk roll 1200, two flights 1206, 1208 transition without a break into the flutes 1210-2 and 1210-6. Likewise, FIGS. 32-35 illustrate an embodiment of the second stalk roll 1300. At the interface of the nose 1302 and body 1304 of the second stalk roll 1300, two flights 1306, 1308 transition without a break into the flutes 1310-4 and 1310-8.

Figure 31:
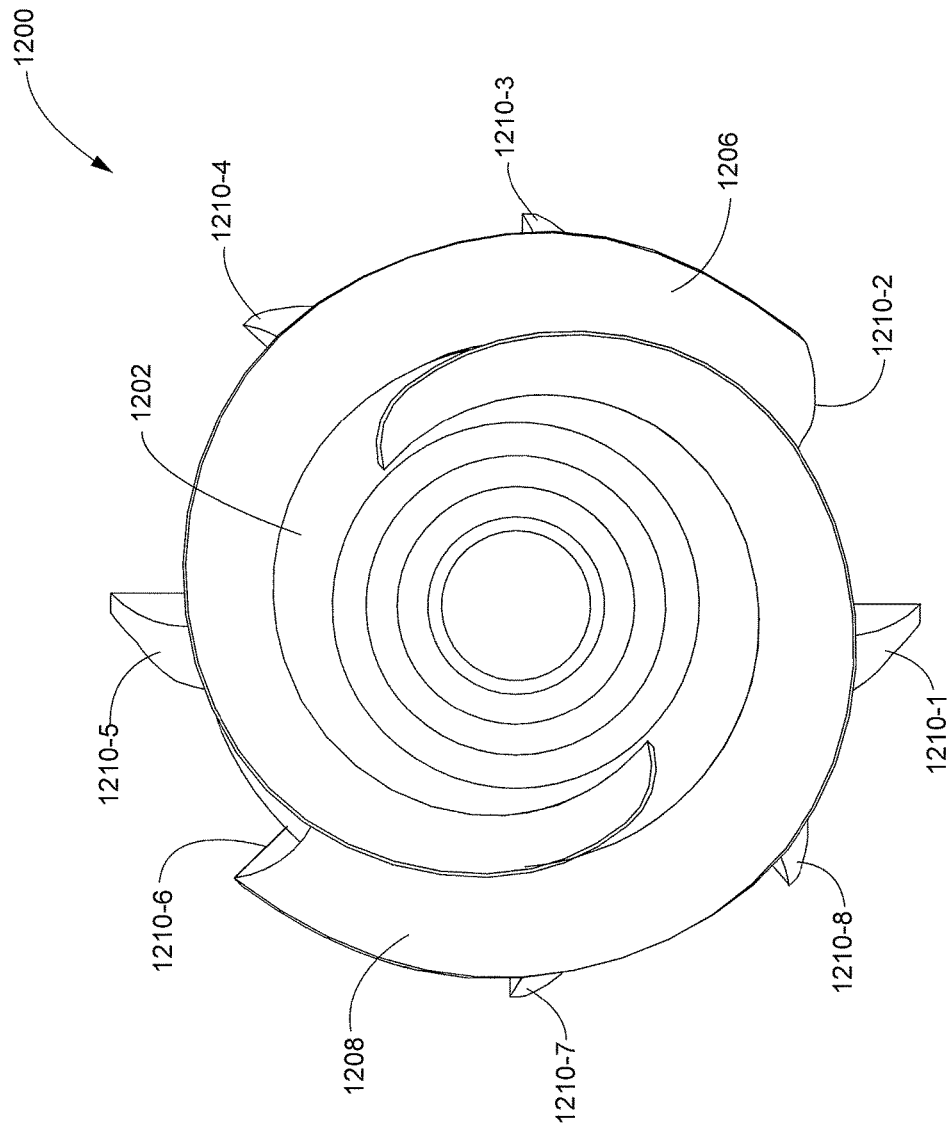
FIG. 31 is a front elevation view of the left stalk roll of FIG. 28.
Figure 32:
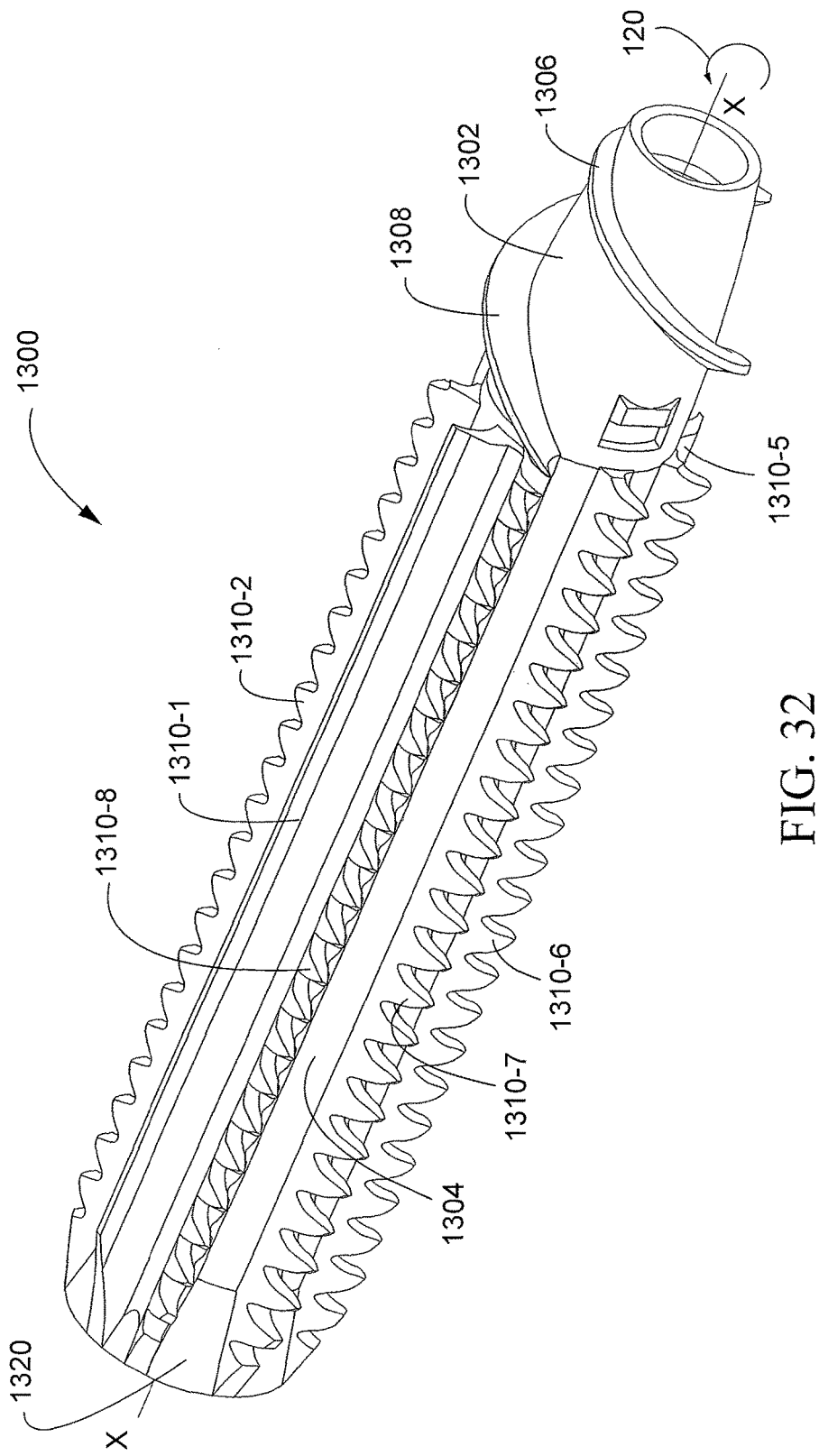
FIG. 32 is a front perspective view of the right stalk roll as viewed in FIG. 27.
Figure 33:
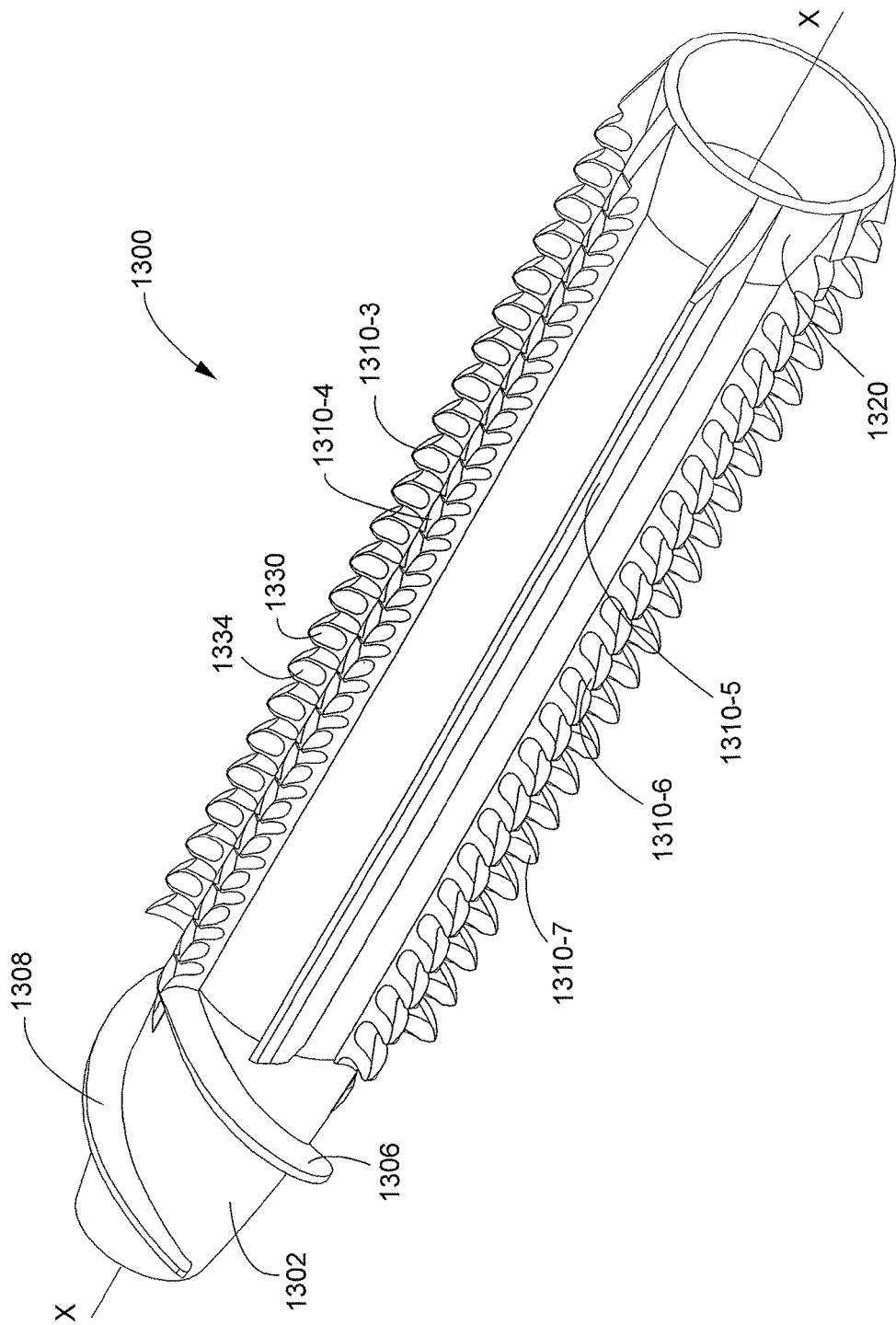
FIG. 33 is a rear perspective view of the left stalk roll of FIG. 32.
Figure 34:
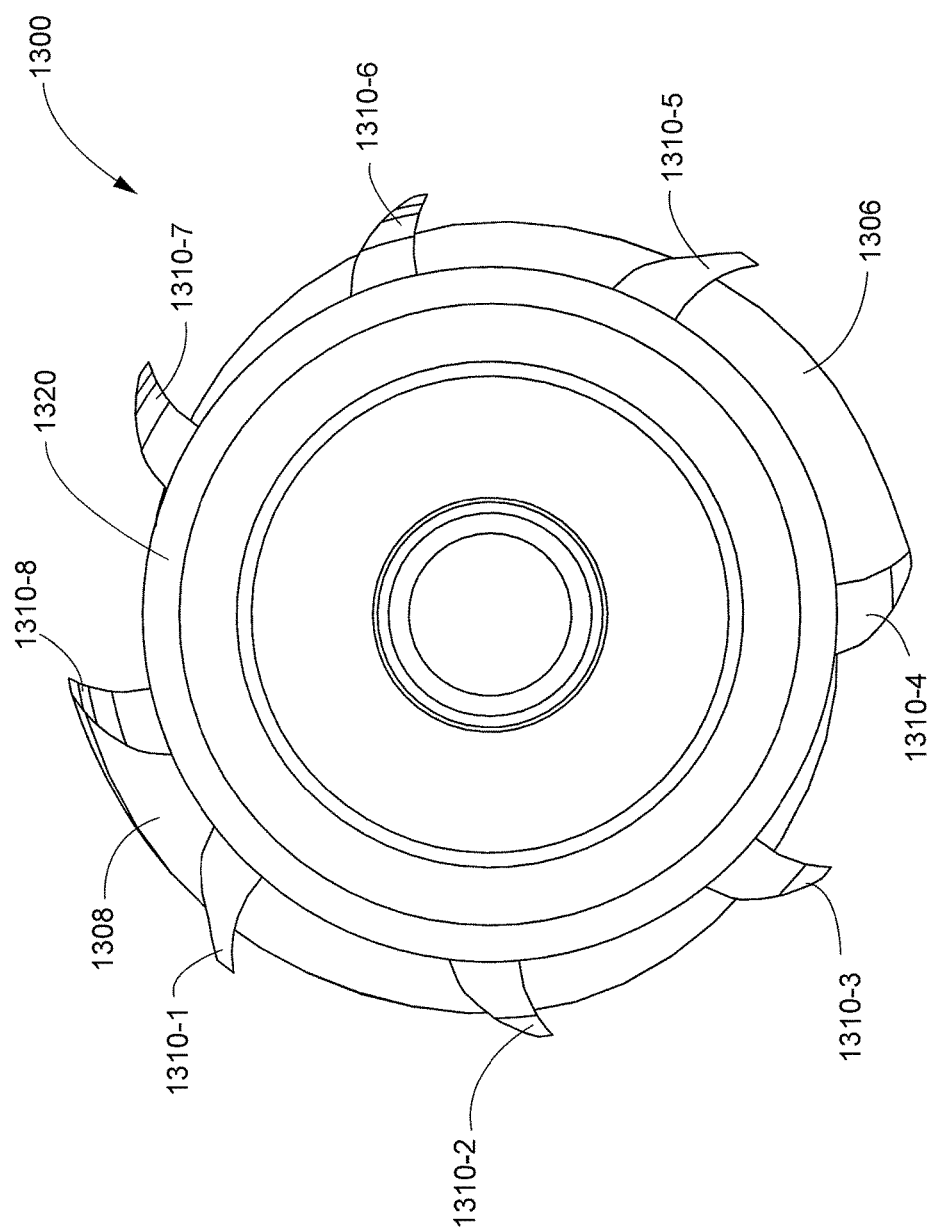
FIG. 34 is a rear elevation view of the left stalk roll of FIG. 32.
Figure 35:
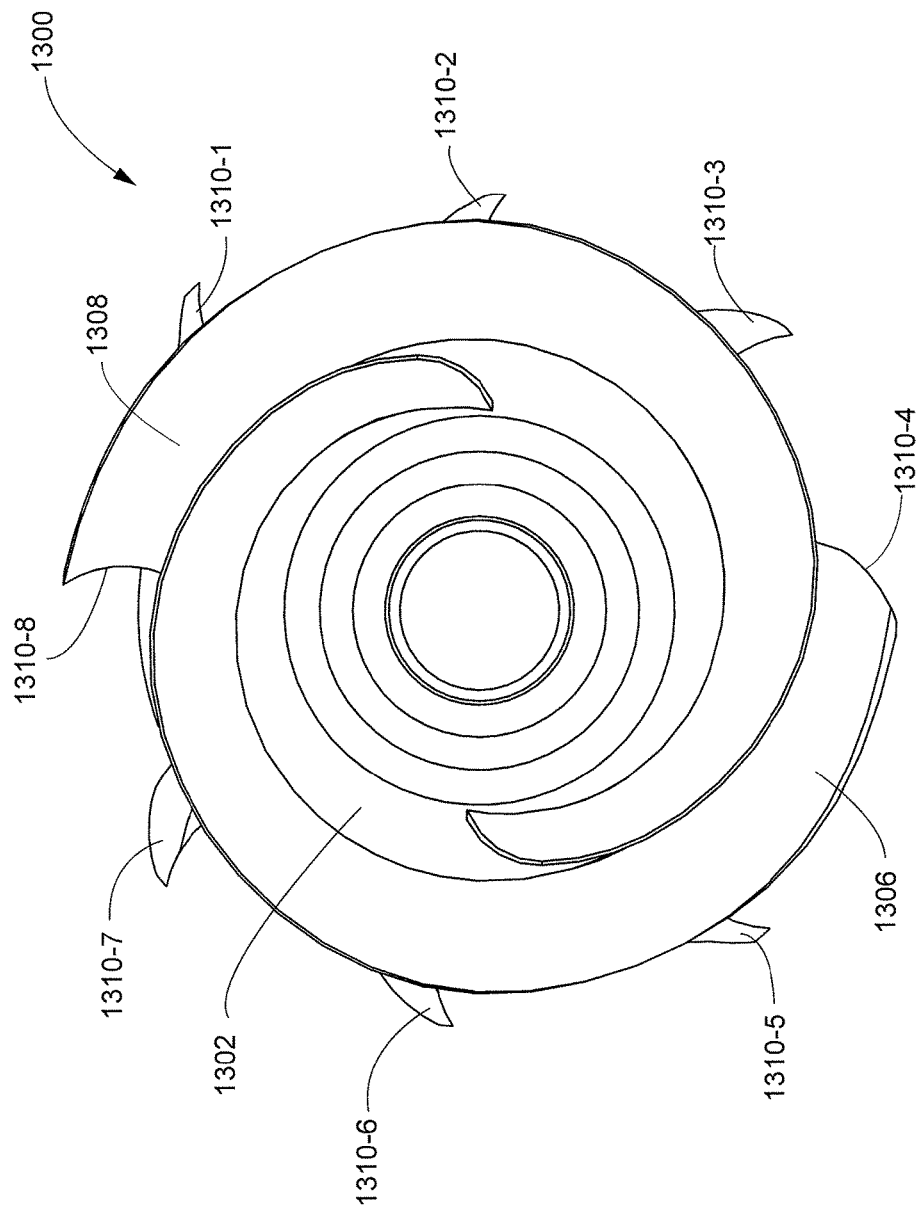
FIG. 35 is a front elevation view of the left stalk roll of FIG. 32.

Comparing FIGS. 31 and 34, it should be appreciated that the flight-to-flute transitions for the second stalk roll 1300 are rotated one flute clockwise the with respect to the first stalk roll 1200 to avoid interference between the flights 1206, 1208 and 1306, 1308 as they rotate past one another. It has been found that stalk rolls with the foregoing flight-to-flute transition improves capturing of the cornstalks 16 between the flights 1206, 1208 and 1306, 1308 of the stalk rolls 1200, 1300 and effectively moves the cornstalks 16 between the cylindrical bodies 1204, 1304 of the stalk rolls 1200, 1300 for crushing and shearing by the flutes 1210, 1310 thereby minimizing the problems encountered with prior art stalk rolls in which the cornstalks stall or hesitate before being pulled between the cylindrical bodies.

In use, as shown in FIG. 27, the stalk rolls 1200, 1300 rotate in opposite directions as indicated by arrows 120. The stalk rolls 1200, 1300 are laterally spaced such that their respective flutes 1210, 1310 overlap as they rotate past one another at about the 3 o'clock and 9 o'clock positions as shown. As previously discussed, the position and rotation of the flutes 1210, 1310 are timed so the flutes do not make contact with one another as they rotate. The cutting flutes 1210-1, 1210-5, 1310-1, 1310-5 of each stalk roll 1200, 1300 are also oriented with respect to one another so that they come together in overlapping relation at about the 3 o'clock and 9 o'clock positions, respectively.

In operation, it should be appreciated that the teeth 1216, 1316 of the puncturing flutes 1210-2, 1210-3, 1210-4, 1210-6, 1210-7, 1210-8 and 1310-2, 1310-3, 1310-4, 1310-6, 1310-7, 1310-8 punch into, puncture and/or pulverize the tough fibrous cornstalks as they rotate through the cornstalk which is desirable for the reasons identified above. When the cutting flutes 1210-1, 1210-5, 1310-1, 1310-5 rotate through the cornstalk, the straight edge 1214, 1314 promotes shearing of the cornstalk by cutting through the cornstalk from each direction producing chopped cornstalk sections which are approximately six to eight inches in length with each rotation.

As with the previous embodiment 100, it has been found that this embodiment 1000, produces cornstalk sections that are six to eight inches in length which are more easily swept aside by the row cleaners of the planter during the next planting season resulting in a furrow and seed bed free of crop residue.

Through testing it has also been found that when the cups 1234 and more blunted configuration of the cupped teeth 1216A, 1316A of the first and second stalk rolls 1200, 1300 mesh with the sharper and deeper valleyed configuration of the teeth 1316B, 1216B of the opposing stalk roll 1300, 1200, respectively, horizontal and vertical fracturing of the cornstalk is promoted.

Accordingly, the stalk roll assembly 1000 produces crop residue that is sufficiently fractured and pulverized to promote uniform decomposition while still having enough integrity to keep the pulverized stalk sections together so it remains the ideal length for being easily swept aside by row cleaners during the next planting season. The more uniform decomposition may result in a more uniform release of nitrogen throughout the life of the next crop and reduce nitrogen immobilization during the critical early growing stages of the next season's crop.

The stalk rolls 200, 300, 1200, 1300 may be made of ductal iron fused with a polymer or any other suitable material combination. The stalk rolls 200, 300, 1200, 1300 may be forged or machined as a single piece or may be made from a plurality of separate components secured together. Generally, the stalk rolls 200, 300, 1200, 1300 are comprised of a shell to which a machine specific internal component is pressed or assembled for mating engagement with a complimentary drive shaft of the row unit assembly on the cornhead.

Various modifications to the embodiments of the apparatus, and the general principles and features of the system and methods described herein will be readily apparent to those of skill in the art. Thus, the invention is not to be limited to the embodiments of the apparatus, system and methods described above and illustrated in the drawing figures, but is to be accorded the widest scope consistent with the spirit and scope of the appended claims.

The invention claimed is:

1. A stalk roll assembly for a header of a combine harvester, comprising:
    a first stalk roll rotating in a first rotational direction about a longitudinal axis, the first stalk roll having a frusto-conical nose transitioning into a cylindrical body, the cylindrical body having a length, a plurality of flutes spaced around and extending radially outwardly from the cylindrical body and extending along the length, and a pair of flights extending helically along the frosto-conical nose, at least one of the plurality of flutes comprising a cutting flute having a straight outer edge, at least one of the other plurality of flutes comprising a puncturing flute having an outer edge with a plurality of teeth spaced longitudinally along the length;

a second stalk roll rotating in a second rotational direction opposite the first rotational direction, the second stalk roll having a frusto-conical nose transitioning into a cylindrical body, the cylindrical body having a length, a plurality of flutes spaced around and extending radially outwardly from the cylindrical body and extending along the length, and a pair of flights extending helically along the frosto-conical nose, at least one of the plurality of flutes comprising a cutting flute having a straight outer edge, at least one of the other plurality of flutes comprising a puncturing flute having an outer edge with a plurality of teeth spaced longitudinally along the length;

wherein the second stalk roll is spaced a distance laterally with respect to said first stalk roll such that the outer edges of the plurality of flutes of the first stalk roll laterally overlap with outer edges of the plurality of flutes of the second stalk roll as the first and second stalk rolls rotate;

wherein at least some of the plurality of flutes of the first stalk roll are curved in a direction toward the first rotational direction and at least some of the plurality of flutes of the second stalk roll are curved in a direction away from the second rotational direction.

2. The stalk roll assembly of claim 1, wherein at least some of the plurality of flutes of the first stalk roll have a concave surface and a convex surface and at least some of the plurality of flutes of the second stalk roll have a concave surface and a convex surface.

3. The stalk roll assembly of claim 2, wherein a first set of the plurality of flutes of the first stalk roll are curved in a direction toward the first rotational direction and a second set of the plurality of flutes of the first stalk roll are curved in a direction away from the first rotational direction, and wherein a first set of the plurality of flutes of the second stalk roll are curved in a direction toward the second rotational direction and a second set of the plurality of flutes of the second stalk roll are curved in a direction away from the second rotational direction.

4. The stalk roll assembly of claim 2, wherein the concave surface includes an indentation forming a cup.

5. The stalk roll assembly of claim 3, wherein the concave surface of the second set of the plurality of flutes of the first and second stalk rolls includes an indentation forming a cup.

6. The stalk roll assembly of claim 1, wherein at least one of the plurality of flutes extends forwardly onto the frusto-conical nose between the pair of helical flights.

7. The stalk roll assembly of claim 6, wherein a circumferentially adjacent flute to the forwardly extending flute terminates rearwardly of another adjacent one of the plurality of flutes.

8. The stalk roll assembly of claim 1, wherein the plurality of flutes comprises ten flutes.

9. The stalk roll assembly of claim 1, wherein the plurality of flutes comprises eight flutes.

10. The stalk roll assembly of claim 1, wherein the plurality of flutes include two cutting flutes.

11. The stalk roll assembly of claim 9, wherein the plurality of flutes include two cutting flutes.

12. The stalk roll assembly of claim 11, wherein the convex surface of one of the cutting flutes is disposed back-to-back with the convex surface of an adjacent flute.

13. The stalk roll assembly of claim 1, wherein each of the other plurality of flutes is a puncturing flute.

14. The stalk roll assembly of claim 10, wherein each of the other plurality of flutes is a puncturing flute.

15. The stalk roll assembly of claim 1, wherein each of the teeth of the puncturing flutes have a tip and whereby adjacent teeth form a valley between adjacent tips.

16. The stalk roll assembly of claim 15, wherein the tips of the teeth of the puncturing flutes of the first and second stalk rolls are longitudinally offset such that the tips of the teeth of the puncturing flutes of each stalk roll extend into the valleys between the adjacent tips of the puncturing flutes of the other stalk roll as the stalk rolls rotate.

* * * * *